(12) United States Patent
Esswie

(10) Patent No.: US 12,720,416 B2
(45) Date of Patent: Aug. 25, 2026

(54) PRIORITY-AWARE NON-TERRESTRIAL BROADCAST INFORMATION DELIVERY

(71) Applicant: Dell Products L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 165 days.

(21) Appl. No.: 18/740,369

(22) Filed: Jun. 11, 2024

(65) Prior Publication Data

US 2025/0380206 A1 Dec. 11, 2025

(51) Int. Cl.
*H04W 48/08* (2009.01)
*H04W 84/06* (2009.01)

(52) U.S. Cl.
CPC ............ *H04W 48/08* (2013.01); *H04W 84/06* (2013.01)

(58) Field of Classification Search
CPC ...... H04W 48/08; H04W 84/06; H04W 48/12
See application file for complete search history.

(56) References Cited

U.S. PATENT DOCUMENTS 11,172,429 B2 * 11/2021 Ishii ...................... H04W 48/12
2023/0189123 A1 * 6/2023 Fan ...................... H04W 48/08 370/254
2025/0253935 A1 8/2025 Cui
2025/0267552 A1 8/2025 Ryu

OTHER PUBLICATIONS

Esswie, Ali. "Priority-Aware Non-Terrestrial Broadcast Information Detection" U.S. Appl. No. 18/740,397, filed Jun. 11, 2024, 94 pages.
"3rd Generation Partnership Project; Technical Specification Group Services and System Aspects; Release 15 Description; Summary of Rel-15 Work Items (Release 15)" 3GPP TR 21.915, V15.0.0, Sep. 2019, 118 pages.

(Continued)

*Primary Examiner* — Kabir A Timory
(74) *Attorney, Agent, or Firm* — Amin, Turocy & Watson, LLP

(57) ABSTRACT

A non-terrestrial radio network node receives, and transmits to a user equipment, ephemeris system information block priority configuration information. The non-terrestrial node determines parameter value change(s) corresponding to an upcoming ephemeris system information block occasion group with respect to a previous/preceding occasion group. The non-terrestrial node assigns, and transmits to the user equipment, an assigned priority, corresponding to the upcoming group, that is based on the determined parameter value change(s) or a rate of change corresponding thereto. From the priority configuration information, the user equipment determines a worst-case parameter value(s) of parameter range(s) corresponding to the assigned priority. The user equipment may determine to avoid receiving updated ephemeris information via an upcoming group occasion if the worst-case parameter value(s) does/do not exceed a configured corresponding asynchronization criterion and may instead transmit uplink traffic during upcoming group occasions.

20 Claims, 19 Drawing Sheets

(56) References Cited

OTHER PUBLICATIONS

"3rd Generation Partnership Project; Technical Specification Group Services and System Aspects; Technical Specification Group working methods (Release 19)" 3GPP TR 21.900, Mar. 2025, 43 pages.
"3rd Generation Partnership Project; Technical Specification Group Services and System Aspects; Release 18 Description; Summary of Rel-18 Work Items (Release 18)" 3GPP TR 21.918, V0.1.0, Dec. 2023, 38 pages.
Office Action mailed May 5, 2026 for U.S. Appl. No. 18/740,397, 48 pages.

* cited by examiner 100
110
115
117
135
137
125
105
106
107
120
121
122
123
124
CORE NETWORK 130
INTERNET SERVICES 150
131
140
145

Figure 4:
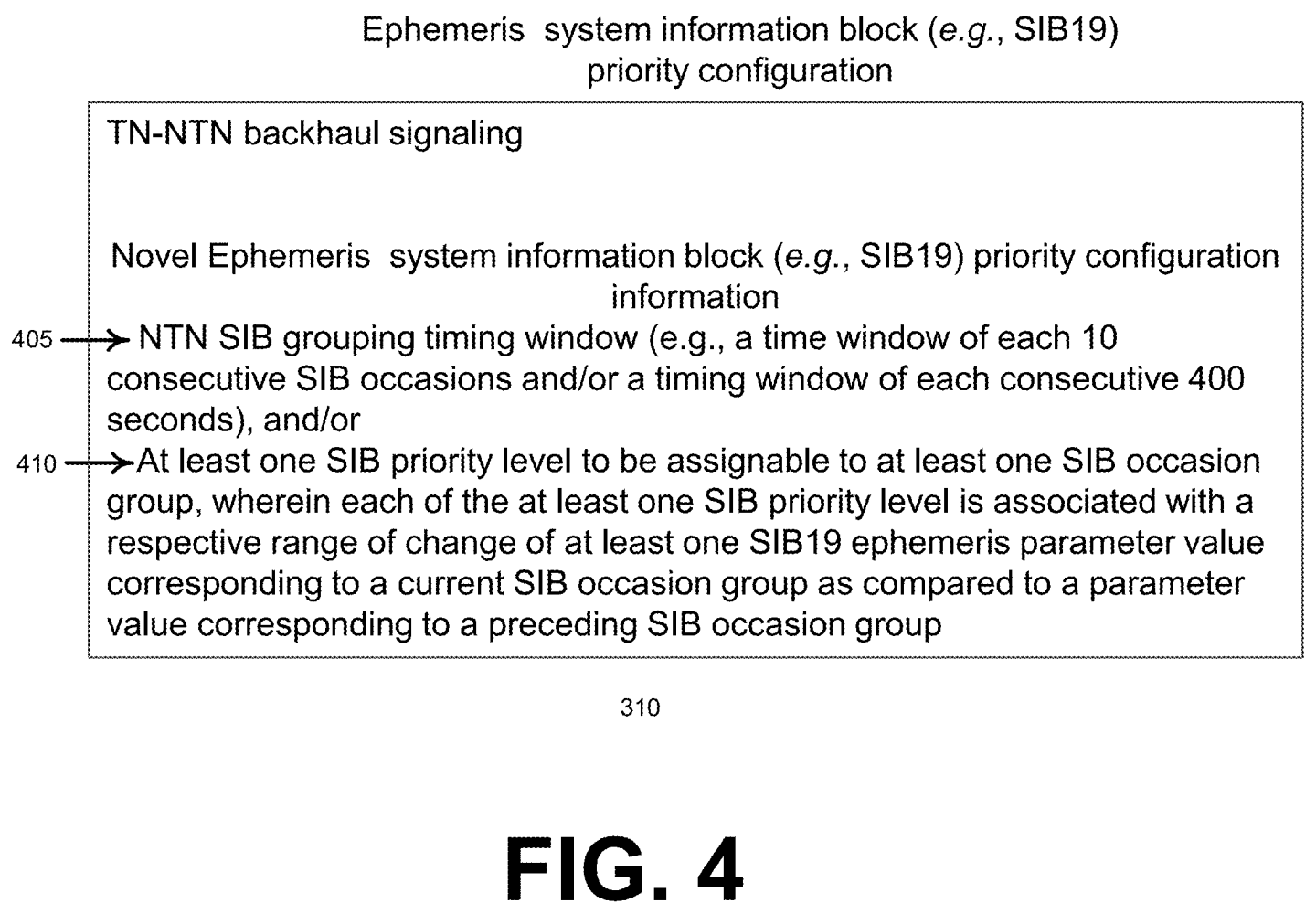

Ephemeris system information block (*e.g.*, SIB19) priority configuration

TN-NTN backhaul signaling

Novel Ephemeris system information block (*e.g.*, SIB19) priority configuration information 405 → NTN SIB grouping timing window (e.g., a time window of each 10 consecutive SIB occasions and/or a timing window of each consecutive 400 seconds), and/or 410 → At least one SIB priority level to be assignable to at least one SIB occasion group, wherein each of the at least one SIB priority level is associated with a respective range of change of at least one SIB19 ephemeris parameter value corresponding to a current SIB occasion group as compared to a parameter value corresponding to a preceding SIB occasion group

Figure 12:
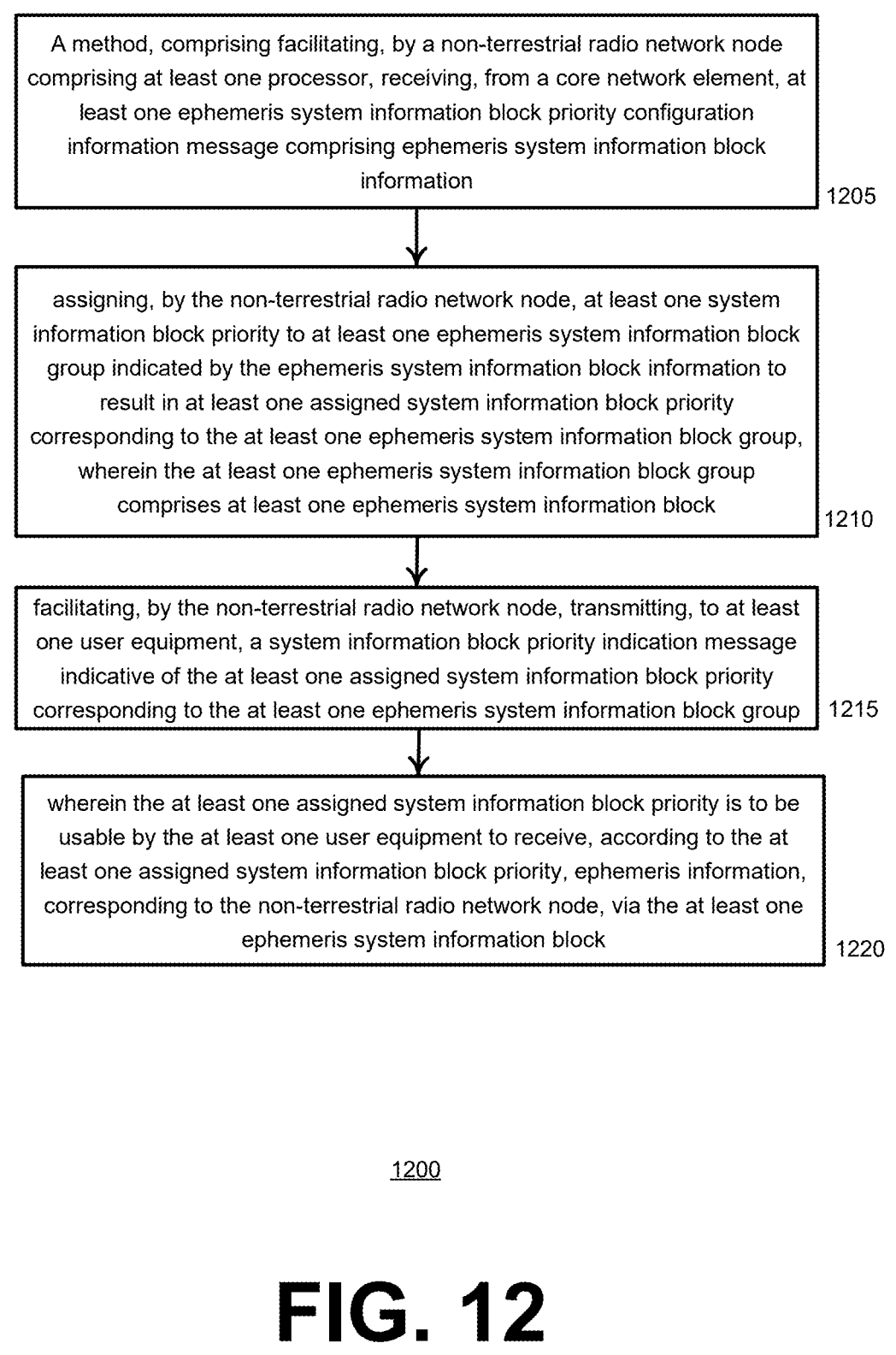

A method, comprising facilitating, by a non-terrestrial radio network node comprising at least one processor, receiving, from a core network element, at least one ephemeris system information block priority configuration information message comprising ephemeris system information block information

1205 assigning, by the non-terrestrial radio network node, at least one system information block priority to at least one ephemeris system information block group indicated by the ephemeris system information block information to result in at least one assigned system information block priority corresponding to the at least one ephemeris system information block group, wherein the at least one ephemeris system information block group comprises at least one ephemeris system information block

1210 facilitating, by the non-terrestrial radio network node, transmitting, to at least one user equipment, a system information block priority indication message indicative of the at least one assigned system information block priority corresponding to the at least one ephemeris system information block group

1215 wherein the at least one assigned system information block priority is to be usable by the at least one user equipment to receive, according to the at least one assigned system information block priority, ephemeris information, corresponding to the non-terrestrial radio network node, via the at least one ephemeris system information block

Figure 13:
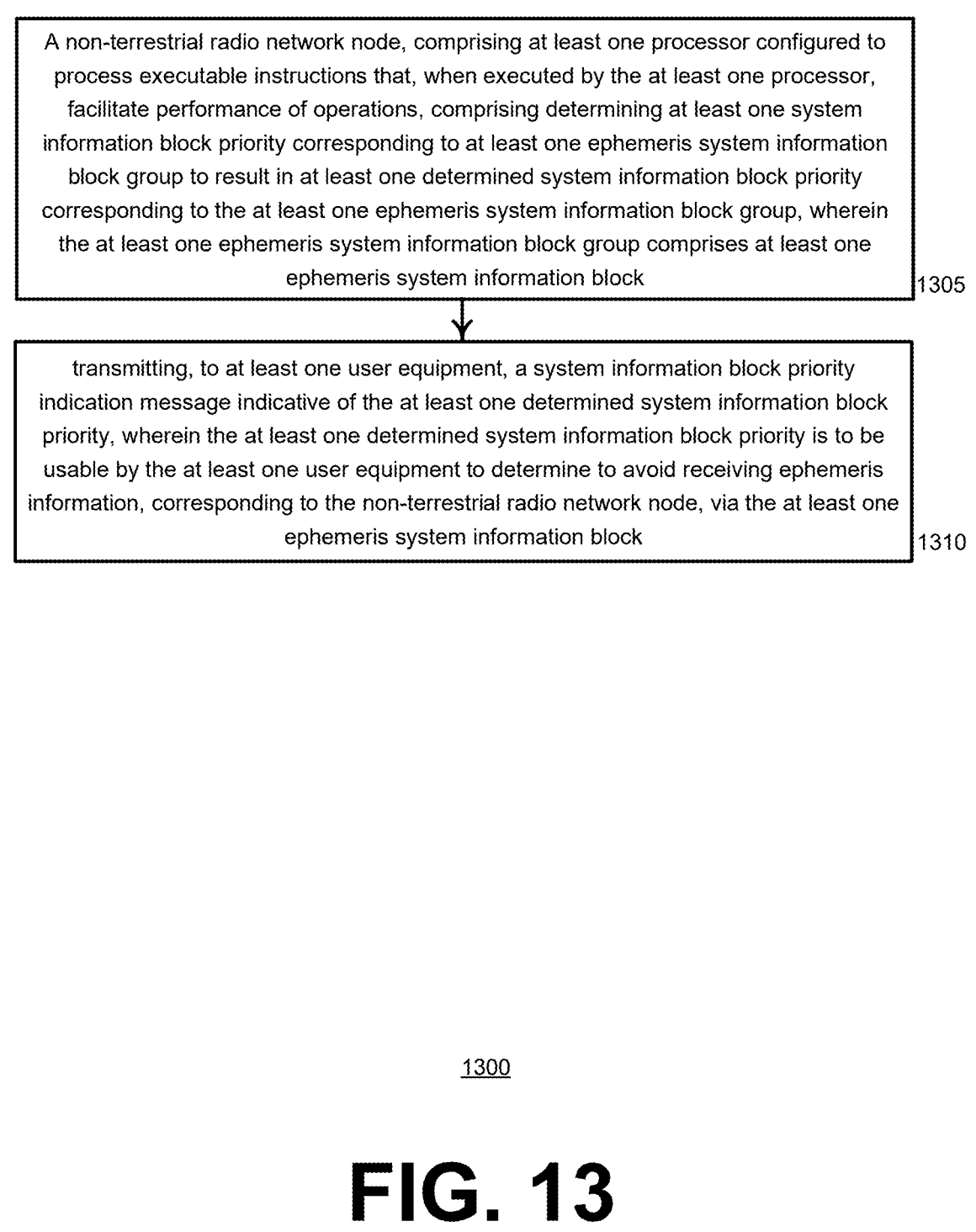

A non-terrestrial radio network node, comprising at least one processor configured to process executable instructions that, when executed by the at least one processor, facilitate performance of operations, comprising determining at least one system information block priority corresponding to at least one ephemeris system information block group to result in at least one determined system information block priority corresponding to the at least one ephemeris system information block group, wherein the at least one ephemeris system information block group comprises at least one ephemeris system information block

1305 transmitting, to at least one user equipment, a system information block priority indication message indicative of the at least one determined system information block priority, wherein the at least one determined system information block priority is to be usable by the at least one user equipment to determine to avoid receiving ephemeris information, corresponding to the non-terrestrial radio network node, via the at least one ephemeris system information block

Figure 14:
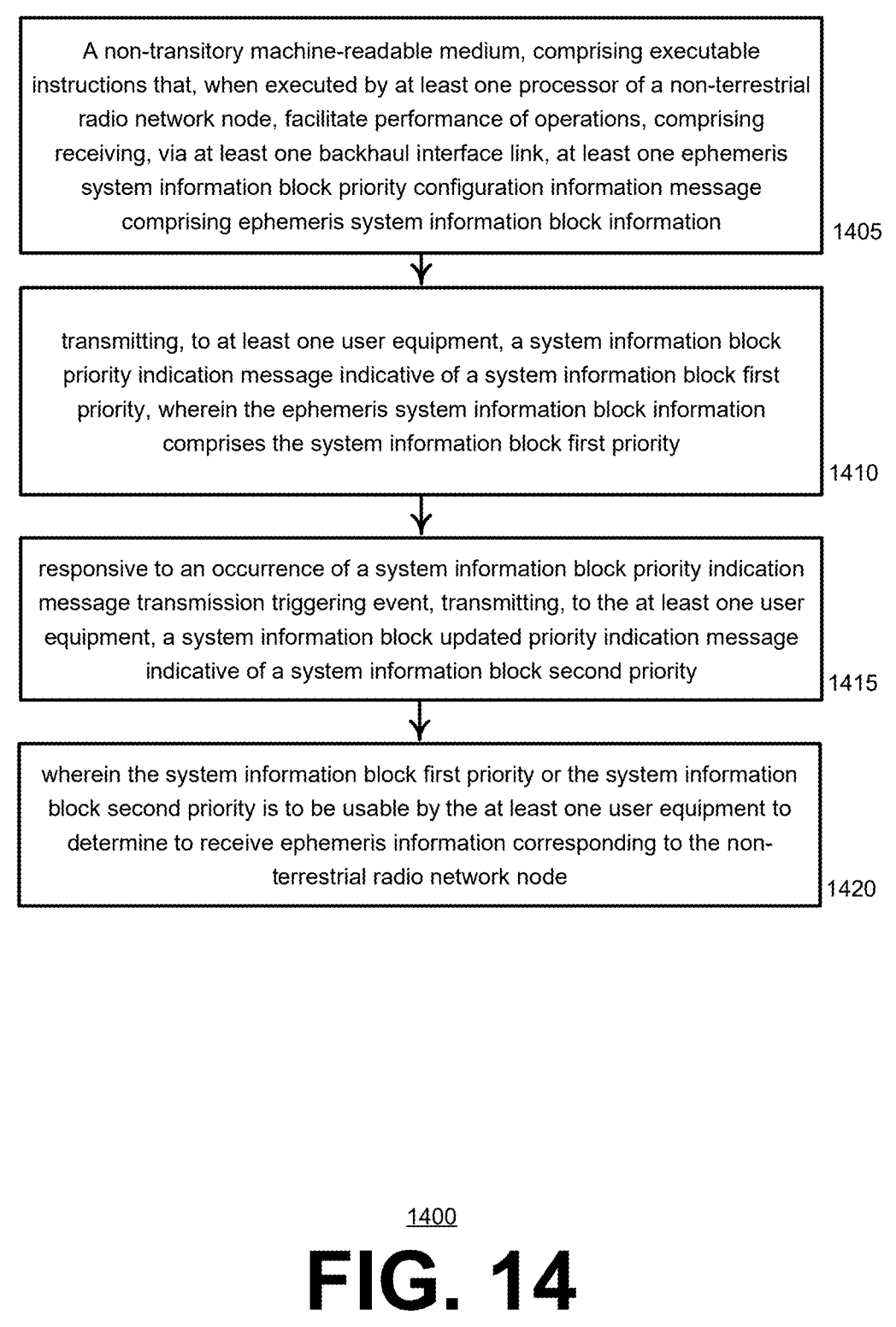

A non-transitory machine-readable medium, comprising executable instructions that, when executed by at least one processor of a non-terrestrial radio network node, facilitate performance of operations, comprising receiving, via at least one backhaul interface link, at least one ephemeris system information block priority configuration information message comprising ephemeris system information block information

1405 transmitting, to at least one user equipment, a system information block priority indication message indicative of a system information block first priority, wherein the ephemeris system information block information comprises the system information block first priority

1410 responsive to an occurrence of a system information block priority indication message transmission triggering event, transmitting, to the at least one user equipment, a system information block updated priority indication message indicative of a system information block second priority

1415 wherein the system information block first priority or the system information block second priority is to be usable by the at least one user equipment to determine to receive ephemeris information corresponding to the non-terrestrial radio network node

Figure 15:
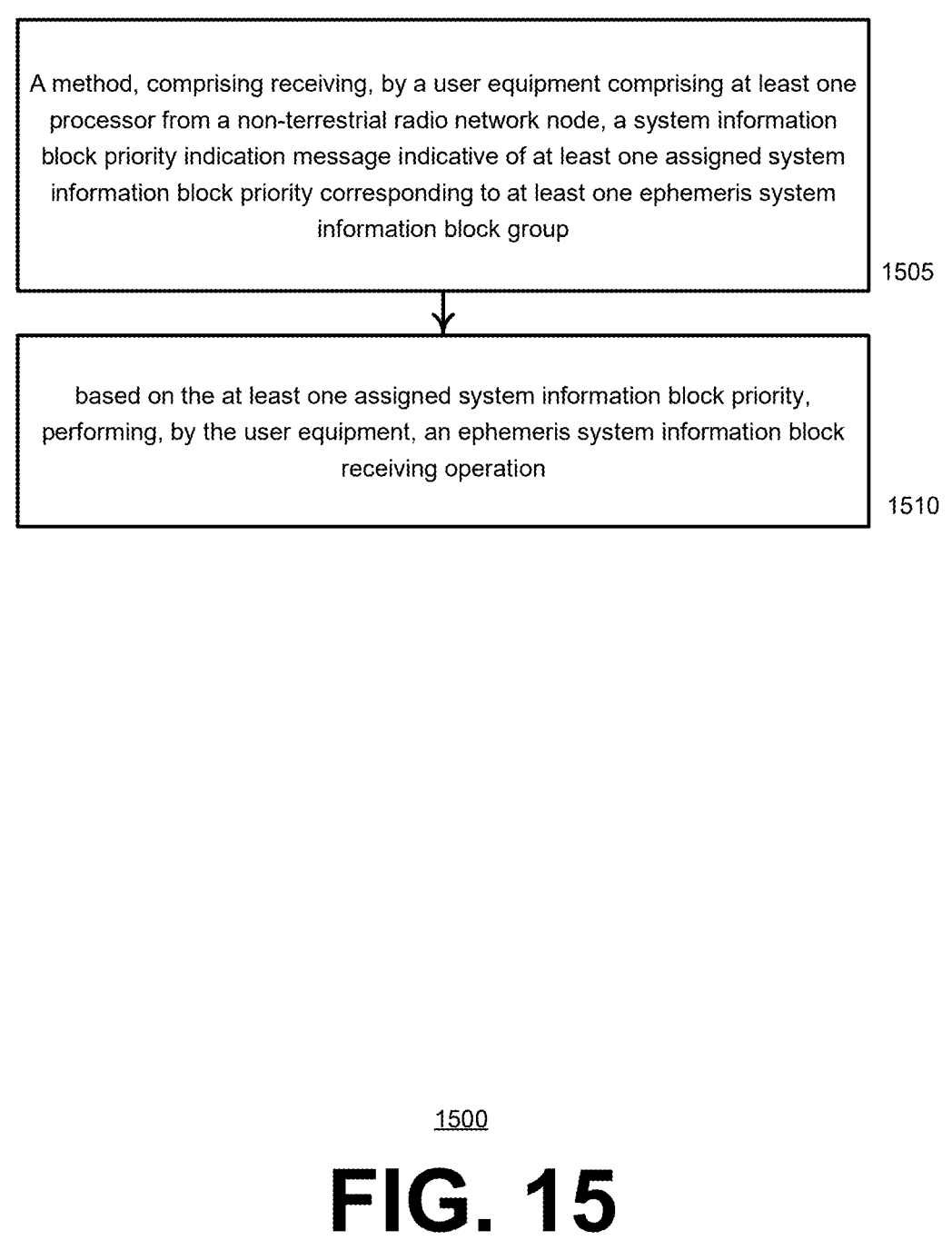

A method, comprising receiving, by a user equipment comprising at least one processor from a non-terrestrial radio network node, a system information block priority indication message indicative of at least one assigned system information block priority corresponding to at least one ephemeris system information block group

1505 based on the at least one assigned system information block priority, performing, by the user equipment, an ephemeris system information block receiving operation

Figure 16:
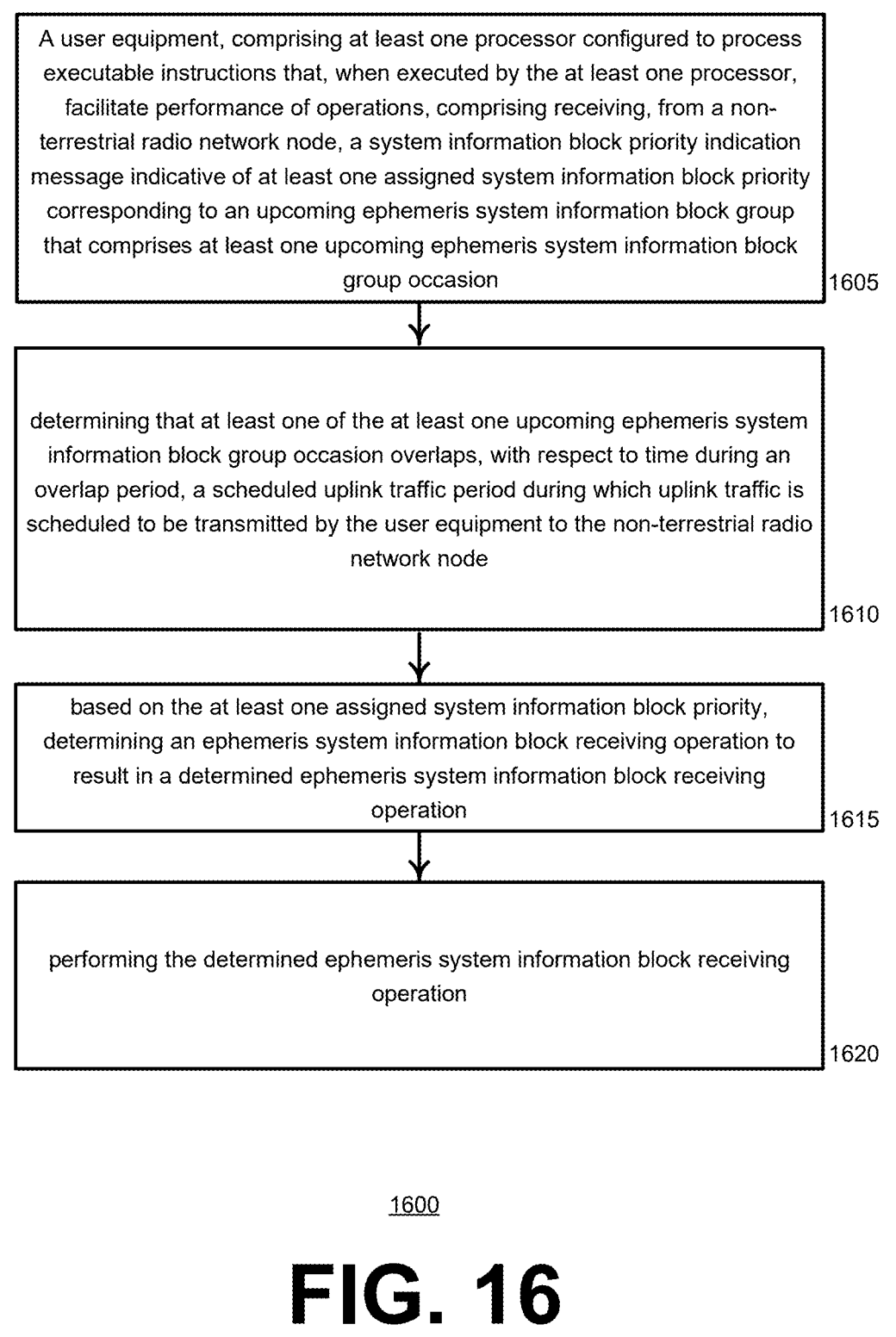

A user equipment, comprising at least one processor configured to process executable instructions that, when executed by the at least one processor, facilitate performance of operations, comprising receiving, from a non-terrestrial radio network node, a system information block priority indication message indicative of at least one assigned system information block priority corresponding to an upcoming ephemeris system information block group that comprises at least one upcoming ephemeris system information block group occasion

1605 determining that at least one of the at least one upcoming ephemeris system information block group occasion overlaps, with respect to time during an overlap period, a scheduled uplink traffic period during which uplink traffic is scheduled to be transmitted by the user equipment to the non-terrestrial radio network node

1610 based on the at least one assigned system information block priority, determining an ephemeris system information block receiving operation to result in a determined ephemeris system information block receiving operation

1615 performing the determined ephemeris system information block receiving operation

Figure 17:
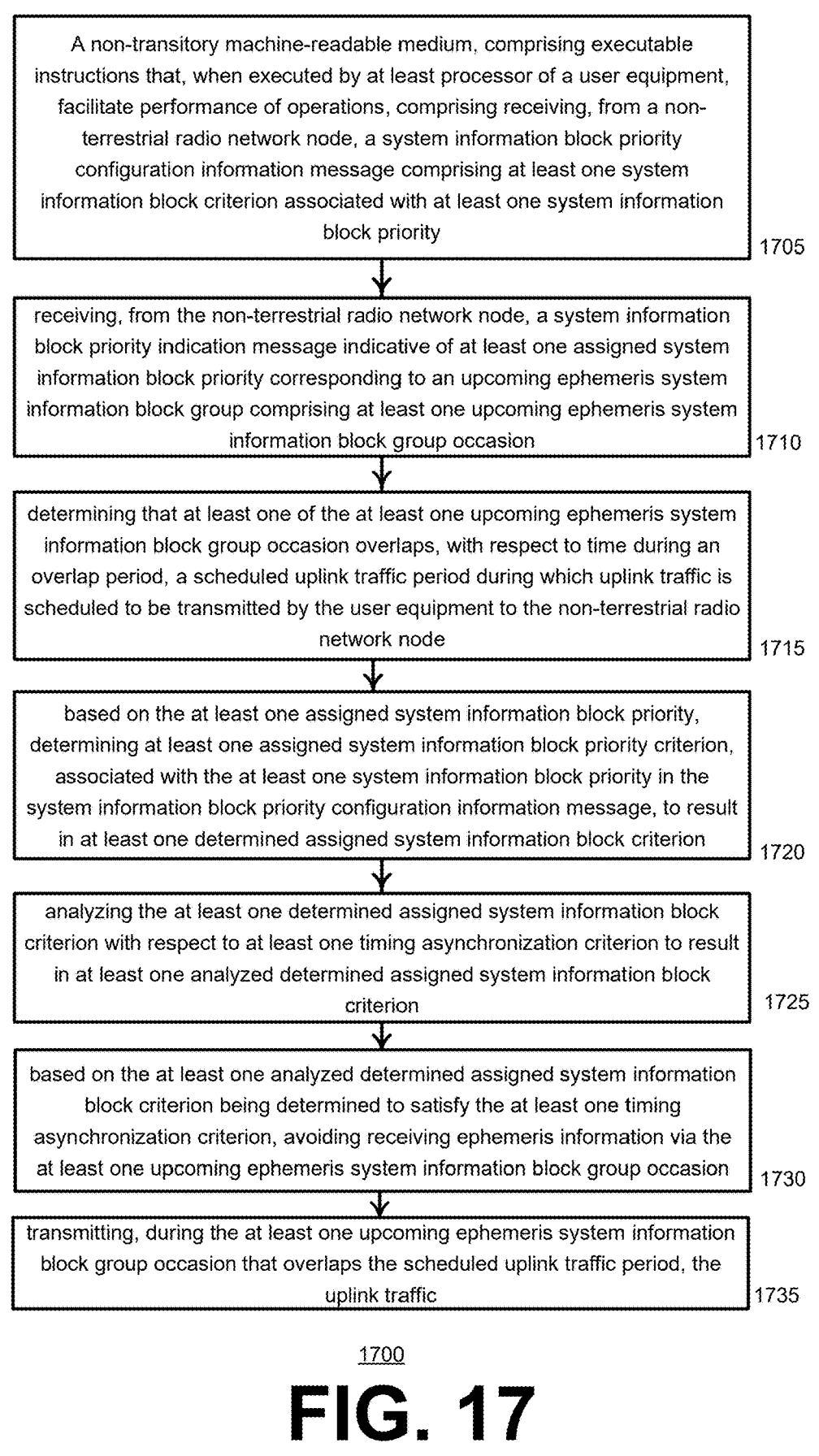

A non-transitory machine-readable medium, comprising executable instructions that, when executed by at least processor of a user equipment, facilitate performance of operations, comprising receiving, from a non-terrestrial radio network node, a system information block priority configuration information message comprising at least one system information block criterion associated with at least one system information block priority

1705 receiving, from the non-terrestrial radio network node, a system information block priority indication message indicative of at least one assigned system information block priority corresponding to an upcoming ephemeris system information block group comprising at least one upcoming ephemeris system information block group occasion

1710 determining that at least one of the at least one upcoming ephemeris system information block group occasion overlaps, with respect to time during an overlap period, a scheduled uplink traffic period during which uplink traffic is scheduled to be transmitted by the user equipment to the non-terrestrial radio network node

1715 based on the at least one assigned system information block priority, determining at least one assigned system information block priority criterion, associated with the at least one system information block priority in the system information block priority configuration information message, to result in at least one determined assigned system information block criterion

1720 analyzing the at least one determined assigned system information block criterion with respect to at least one timing asynchronization criterion to result in at least one analyzed determined assigned system information block criterion

1725 based on the at least one analyzed determined assigned system information block criterion being determined to satisfy the at least one timing asynchronization criterion, avoiding receiving ephemeris information via the at least one upcoming ephemeris system information block group occasion

1730 transmitting, during the at least one upcoming ephemeris system information block group occasion that overlaps the scheduled uplink traffic period, the uplink traffic

PRIORITY-AWARE NON-TERRESTRIAL BROADCAST INFORMATION DELIVERY

REFERENCE TO RELATED APPLICATION

The subject patent application is related to U.S. patent application Ser. No. 18/740,397, filed Jun. 11, 2024, and entitled "PRIORITY-AWARE NON-TERRESTRIAL BROADCAST INFORMATION DETECTION", the entirety of which application is hereby incorporated by reference herein.

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a non-terrestrial radio network node comprising at least one processor, receiving, from a core network element, at least one ephemeris system information block priority configuration information message comprising ephemeris system information block information. The method may further comprise assigning, by the non-terrestrial radio network node, at least one system information block priority to at least one ephemeris system information block group indicated by the ephemeris system information block information to result in at least one assigned system information block priority corresponding to the at least one ephemeris system information block group, wherein the at least one ephemeris system information block group comprises at least one ephemeris system information block. The method may further comprise facilitating, by the non-terrestrial radio network node, transmitting, to at least one user equipment, a system information block priority indication message indicative of the at least one assigned system information block priority corresponding to the at least one ephemeris system information block group. The at least one assigned system information block priority may be usable by the at least one user equipment to receive, according to the at least one assigned system information block priority, ephemeris information, corresponding to the non-terrestrial radio network node, via the at least one ephemeris system information block.

The ephemeris system information block information may comprise at least one of: an ephemeris system information block group information indication indicative ephemeris system information block group information corresponding to at least one ephemeris system information block group, or at least one ephemeris system information block group priority indication indicative of at least one ephemeris system information block group priority.

In an example embodiment, the assigning of the at least one system information block priority to the at least one ephemeris system information block group may be based on determining, by the non-terrestrial radio network node, at least one system information block parameter change value, associated with at least one system information block parameter, corresponding to the at least one ephemeris system information block group.

In an example embodiment, the facilitating of the transmitting of the system information block priority indication message may be responsive to receiving, by the non-terrestrial radio network node from the at least one user equipment, a system information block priority indication request.

In an example embodiment, the facilitating of the transmitting of the system information block priority indication message may be responsive to expiration of a configured system information block priority broadcast periodicity. The ephemeris system information block information may comprise a system information block priority broadcast periodicity indication indicative of the configured system information block priority broadcast periodicity.

The at least one ephemeris system information block may be a system information block 19 ("SIB19") message.

In an example embodiment, the at least one ephemeris system information block group may be a first ephemeris system information block group. The ephemeris information may comprise at least one first ephemeris parameter value corresponding to at least one ephemeris parameter and associated with the first ephemeris system information block group. The at least one first ephemeris system information block group occasion may correspond to transmitting, by the non-terrestrial radio network node, first system information block information associated with the at least one ephemeris parameter. A second ephemeris system information block group may comprise at least one second ephemeris system information block group occasion corresponding to transmitting, by the non-terrestrial radio network node and second system information block information associated with the at least one ephemeris parameter. The at least one assigned system information block priority may be assigned to the first ephemeris system information block group. The at least one second ephemeris system information block group occasion may occur before the at least one first ephemeris system information block group occasion. The method may further comprise determining, by the non-terrestrial radio network node, the at least one assigned system information block priority based on at least one ephemeris parameter difference between the at least one first ephemeris parameter value and at least one second ephemeris parameter value that corresponds to the at least one ephemeris parameter and that is associated with the second ephemeris system information block group.

In an example embodiment, the ephemeris system information block information may comprise the at least one assigned system information block priority. The ephemeris system information block information may comprise at least one ephemeris parameter difference criterion associated with the at least one assigned system information block priority. The determining the at least one assigned system information block priority may further comprise analyzing the at least one ephemeris parameter difference with respect to the at least one ephemeris parameter difference criterion to result in an analyzed at least one ephemeris parameter difference. The at least one assigned system information block priority may be assigned based on the at least one ephemeris parameter difference being determined to satisfy the at least one ephemeris parameter difference criterion.

The at least one ephemeris parameter may comprise at least one of: a timing advance associated with the non-terrestrial radio network node, a frequency shift associated with the non-terrestrial radio network node, a doppler shift associated with the non-terrestrial radio network node, or a location associated with the non-terrestrial radio network node.

In an example embodiment, the determining of the at least one assigned system information block priority may comprise applying at least one function to the at least one first ephemeris system information block group occasion. The applying of the at least one function may comprise determining an average of at least one first ephemeris system information block group occasion parameter value to result in the at least one first ephemeris parameter value or filtering the at least one first ephemeris system information block group occasion parameter value to result in the at least one first ephemeris parameter value.

In another example embodiment, a non-terrestrial radio network node may comprise at least one processor configured to process executable instructions that, when executed by the at least one processor, may facilitate performance of operations that may comprise determining at least one system information block priority corresponding to at least one ephemeris system information block group to result in at least one determined system information block priority corresponding to the at least one ephemeris system information block group, wherein the at least one ephemeris system information block group comprises at least one ephemeris system information block, and transmitting, to at least one user equipment, a system information block priority indication message indicative of the at least one determined system information block priority. The at least one determined system information block priority may be usable by the at least one user equipment to determine to avoid receiving ephemeris information, corresponding to the non-terrestrial radio network node, via the at least one ephemeris system information block.

In an example embodiment, the determining of the at least one system information block priority may be based on at least one ephemeris parameter difference between at least one first ephemeris parameter value that corresponds to a first ephemeris system information block group and at least one second ephemeris parameter value that corresponds to a second ephemeris system information block group. The at least one first ephemeris parameter value and the at least one second ephemeris parameter value may correspond to at least one of: a timing advance parameter associated with the non-terrestrial radio network node, a frequency shift parameter associated with the non-terrestrial radio network node, a doppler shift parameter associated with the non-terrestrial radio network node, or a location parameter associated with the non-terrestrial radio network node.

In an example embodiment, the operations may further comprise determining a system information block updated priority corresponding to the at least one ephemeris system information block group to result in at least one determined system information block updated priority corresponding to the at least one ephemeris system information block group, and transmitting, to the at least one user equipment, a system information block updated priority indication message indicative of the at least one determined system information block updated priority. The at least one determined system information block updated priority may be usable by the at least one user equipment to determine to avoid receiving ephemeris information, corresponding to the non-terrestrial radio network node, via the at least one ephemeris system information block.

In an example embodiment, the determining of the at least one system information block updated priority may comprise analyzing at least one ephemeris parameter difference with respect to at least one ephemeris parameter difference criterion to result in at least one analyzed ephemeris parameter difference, and determining that the at least one analyzed ephemeris parameter difference satisfies at least one of the at least one ephemeris parameter difference criterion corresponding to the at least one determined system information block updated priority.

In another example embodiment, a method may comprise receiving, by a user equipment comprising at least one processor from a non-terrestrial radio network node, a system information block priority indication message indicative of at least one assigned system information block priority corresponding to at least one ephemeris system information block group. Based on the at least one assigned system information block priority, the method may further comprise performing, by the user equipment, an ephemeris system information block receiving operation.

The at least one ephemeris system information block group may comprise at least one ephemeris system information block group occasion that overlaps, with respect to time during an overlap period, a scheduled uplink traffic period during which scheduled uplink traffic is scheduled to be transmitted by the user equipment.

In an example embodiment, the ephemeris system information block receiving operation may comprise avoiding, by the user equipment, receiving ephemeris information via the at least one ephemeris system information block group.

The method may further comprise receiving, by the user equipment, a system information block priority configuration information message comprising at least one system information block criterion associated with at least one assigned system information block priority. Based on the at least one assigned system information block priority, the method may further comprise determining, by the user equipment, at least one assigned system information block priority criterion to result in at least one determined assigned system information block criterion. The method may further comprise analyzing the at least one determined assigned system information block criterion with respect to a timing asynchronization criterion to result in at least one analyzed determined assigned system information block criterion. The avoiding of the receiving of ephemeris information via the at least one ephemeris system information block group may be based on the at least one analyzed determined assigned system information block criterion being determined to satisfy the timing asynchronization criterion.

The at least one determined assigned system information block criterion may be an upper value associated with at least one parameter range or an upper bound that defines the range that may be indicated in the system information block priority configuration information message and that may correspond to the at least one assigned system information block priority.

In an example embodiment, the ephemeris system information block receiving operation may further comprise receiving, by the user equipment, ephemeris information via the at least one ephemeris system information block group.

The method may further comprise receiving, by the user equipment from the non-terrestrial radio network node, a system information block priority configuration information message comprising at least one system information block criterion associated with at least one system information block priority. Based on the at least one assigned system information block priority, the method may further comprise determining, by the user equipment, at least one assigned system information block priority criterion to result in at least one determined assigned system information block criterion. The method may further comprise analyzing the at least one determined assigned system information block criterion with respect to at least one timing asynchronization criterion to result in at least one analyzed determined assigned system information block criterion The receiving of the ephemeris information via the at least one ephemeris system information block group may be based on the at least one analyzed determined assigned system information block criterion being determined to fail to satisfy the at least one timing asynchronization criterion.

In an example embodiment, the receiving of the ephemeris information via the at least one ephemeris system information block group occurs during at least one occasion portion of the overlap period that overlaps, with respect to time, the scheduled uplink traffic period, and the method may further comprise, during the at least one occasion portion, avoiding, by the user equipment, transmitting the scheduled uplink traffic to result in avoided scheduled uplink traffic. The method may further comprise transmitting, by the user equipment, the avoided scheduled uplink traffic after the receiving of the ephemeris information during the at least one occasion portion. The at least one determined assigned system information block criterion may be a highest value associated with, that defines or is a maximum value of, at least one parameter range, indicated in the system information block priority configuration information message, corresponding to the at least one assigned system information block priority.

In another example embodiment, user equipment may comprise at least one processor configured to process executable instructions that, when executed by the at least one processor, may facilitate performance of operations that may comprise receiving, from a non-terrestrial radio network node, a system information block priority indication message indicative of at least one assigned system information block priority corresponding to an upcoming ephemeris system information block group that comprises at least one upcoming ephemeris system information block group occasion, and determining that at least one of the at least one upcoming ephemeris system information block group occasion overlaps, with respect to time during an overlap period, a scheduled uplink traffic period during which uplink traffic is scheduled to be transmitted by the user equipment to the non-terrestrial radio network node. Based on the at least one assigned system information block priority, the operations may further comprise determining an ephemeris system information block receiving operation to result in a determined ephemeris system information block receiving operation. The operations may further comprise performing the determined ephemeris system information block receiving operation.

In an example embodiment, the determined ephemeris system information block receiving operation may comprise avoiding receiving ephemeris information via the upcoming ephemeris system information block group. The operations may further comprise transmitting the uplink traffic during the at least one of the at least one upcoming ephemeris system information block group occasion that overlaps the scheduled uplink traffic period.

In an example embodiment, the determined ephemeris system information block receiving operation may comprise receiving ephemeris information via the upcoming ephemeris system information block group.

In an example embodiment, the operations may further comprise receiving, from the non-terrestrial radio network node, a system information block priority configuration information message comprising at least one system information block criterion associated with at least one assigned system information block priority. Based on the at least one assigned system information block priority, the operations may further comprise determining, by the user equipment, at least one assigned system information block priority criterion, associated with the at least one assigned system information block priority indicated in the system information block priority configuration information message, to result in at least one determined assigned system information block criterion. The operations may further comprise analyzing the at least one determined assigned system information block criterion with respect to a timing asynchronization criterion to result in at least one analyzed determined assigned system information block criterion. The determining the determined ephemeris system information block receiving operation may be based on the at least one analyzed determined assigned system information block criterion.

In yet another example embodiment, a non-transitory machine-readable medium may comprise executable instructions that, when executed by at least processor of a user equipment, may facilitate performance of operations that may comprise receiving, from a non-message comprising at least one system information block criterion associated with at least one system information block priority, and receiving, from the non-terrestrial radio network node, a system information block priority indication message indicative of at least one assigned system information block priority corresponding to an upcoming ephemeris system information block group comprising at least one upcoming ephemeris system information block group occasion.

In an example embodiment, the system information block priority configuration information message and the system information block priority indication message may be part of the same message or may be delivered substantially simultaneously. In an example embodiment, the system information block priority configuration information message and the system information block priority indication message may be separate messages not delivered substantially simultaneously.

The operations may further comprise determining that at least one of the at least one upcoming ephemeris system information block group occasion overlaps, with respect to time during an overlap period, a scheduled uplink traffic period during which uplink traffic is scheduled to be transmitted by the user equipment to the non-terrestrial radio network node. Based on the at least one assigned system information block priority, the operations may further comprise determining at least one assigned system information block priority criterion, associated with the at least one system information block priority in the system information block priority configuration information message, to result in at least one determined assigned system information block criterion. The operations may further comprise analyzing the at least one determined assigned system information block criterion with respect to at least one timing asynchronization criterion to result in at least one analyzed determined assigned system information block criterion. Based on the at least one analyzed determined assigned system information block criterion being determined to satisfy the at least one timing asynchronization criterion, the operations may further comprise avoiding receiving ephemeris information via the at least one upcoming ephemeris system information block group occasion. The operations may further comprise transmitting, during the at least one upcoming ephemeris system information block group occasion that overlaps the scheduled uplink traffic period, the uplink traffic.

In an example embodiment, the at least one system information block criterion, which may be associated in the system information block priority configuration information message with the at least one system information block priority, may comprise at least one parameter range defined by at least one lower parameter value and at least one upper parameter value. The at least one determined assigned system information block criterion may comprise at least one assigned upper parameter value corresponding to the at least one assigned system information block priority. Determination that the at least one analyzed determined assigned system information block criterion satisfies the at least one timing asynchronization criterion may correspond to the at least one upper parameter value being less than or equal to the at least one timing asynchronization criterion.

In an example embodiment, the at least one parameter range may be defined by at least one lower timing advance value and at least one upper timing advance value. The at least one timing asynchronization criterion may comprise an end-to-end synchronization mismatch tolerance for synchronization mismatch between the user equipment and a network element. The at least one timing asynchronization criterion being satisfied by the at least one analyzed determined assigned system information block criterion may correspond to an actual synchronization mismatch between the user equipment and the network element not exceeding the end-to-end synchronization mismatch tolerance.

In an example embodiment, the at least one assigned system information block priority may be assigned by the non-terrestrial radio network node based on at least one determined parameter difference, determined by the non-terrestrial radio network node, between at least one first determined parameter value and at least one second determined parameter value. The at least one first determined parameter value and the at least one second determined parameter value may be determined by the non-terrestrial radio network node. The at least one first determined parameter value may correspond to an ephemeris system information block group comprising an upcoming ephemeris system information block group occasion. The at least one second determined parameter value may correspond to a previous ephemeris system information block group. The previous ephemeris system information block group may comprise at least one previous ephemeris system information block group occasion that occurs before the at least one upcoming ephemeris system information block group occasion. In an example embodiment, the at least one determined parameter difference may be a rate of change of the at least one first determined parameter value determined with respect to the at least one second determined parameter value. In an example embodiment, the at least one determined parameter difference may be a percentage rate of change of the at least one first determined parameter value determined with respect to the at least one second determined parameter value.

In another example embodiment, a non-transitory machine-readable medium may comprise executable instructions that, when executed by at least one processor of a non-terrestrial radio network node, may facilitate performance of operations, that may comprise receiving, via at least one backhaul interface link, at least one ephemeris system information block priority configuration information message comprising ephemeris system information block information, and transmitting, to at least one user equipment, a system information block priority indication message indicative of a system information block first priority, wherein the ephemeris system information block information comprises the system information block first priority. Responsive to an occurrence of a system information block priority indication message transmission triggering event, the operations may further comprise transmitting, to the at least one user equipment, a system information block updated priority indication message indicative of a system information block second priority. The system information block first priority or the system information block second priority may be usable by the at least one user equipment to determine whether to receive ephemeris information corresponding to the non-terrestrial radio network node.

In an example embodiment, the system information block first priority may correspond to a first ephemeris system information block group. The system information block second priority may correspond to a second ephemeris system information block group. The operations may further comprise determining a first parameter value corresponding to the first ephemeris system information block group, determining a second parameter value corresponding to the second ephemeris system information block group, and determining an ephemeris parameter difference based on the first parameter value and the second parameter value. The operations may further comprise analyzing the ephemeris parameter difference with respect to at least one ephemeris parameter difference criterion to result in at least one analyzed ephemeris parameter difference. The system information block second priority may be determined based on the at least one analyzed ephemeris parameter difference being determined to satisfy at least one of the at least one ephemeris parameter difference criterion corresponding to the system information block second priority.

The system information block priority indication message transmission triggering event may be one of: reception of a system information block priority indication request or expiration of a configured system information block priority broadcast periodicity. In an example embodiment, system information block priority indication request may be received from the at least one user equipment. In another example embodiment, the system information block priority indication request may be received from a shared core network entity or a core network entity/component.

In an example embodiment, the system information block priority indication message may further be indicative of a first ephemeris parameter difference criterion associated with the system information block first priority or a second ephemeris parameter difference criterion associated with the system information block second priority. The first ephemeris parameter difference criterion or the second ephemeris parameter difference criterion may be usable by the at least one user equipment to determine whether to receive the ephemeris information corresponding to the non-terrestrial radio network node.

BRIEF DESCRIPTION OF THE DRAWINGS

Feature(s) and advantage(s) of one or more of the various embodiments of the subject application will become more apparent where described in the detailed description and when taken in conjunction with the accompanying drawings in which:

FIG. 4 illustrates an example ephemeris system information block priority configuration information message comprising ephemeris system information block information.

FIG. 12 illustrates a block diagram of an example method in accordance with an embodiment of the subject application.

FIG. 13 illustrates a block diagram of an example non-terrestrial radio network node in accordance with an embodiment of the subject application.

FIG. 14 illustrates a block diagram of an example non-transitory machine-readable medium in accordance with an embodiment of the subject application.

FIG. 15 illustrates a block diagram of an example method in accordance with an embodiment of the subject application.

FIG. 16 illustrates a block diagram of an example user equipment in accordance with an embodiment of the subject application.

FIG. 17 illustrates a block diagram of an example non-transitory machine-readable medium.

DETAILED DESCRIPTION OF THE DRAWINGS

Figure 1:
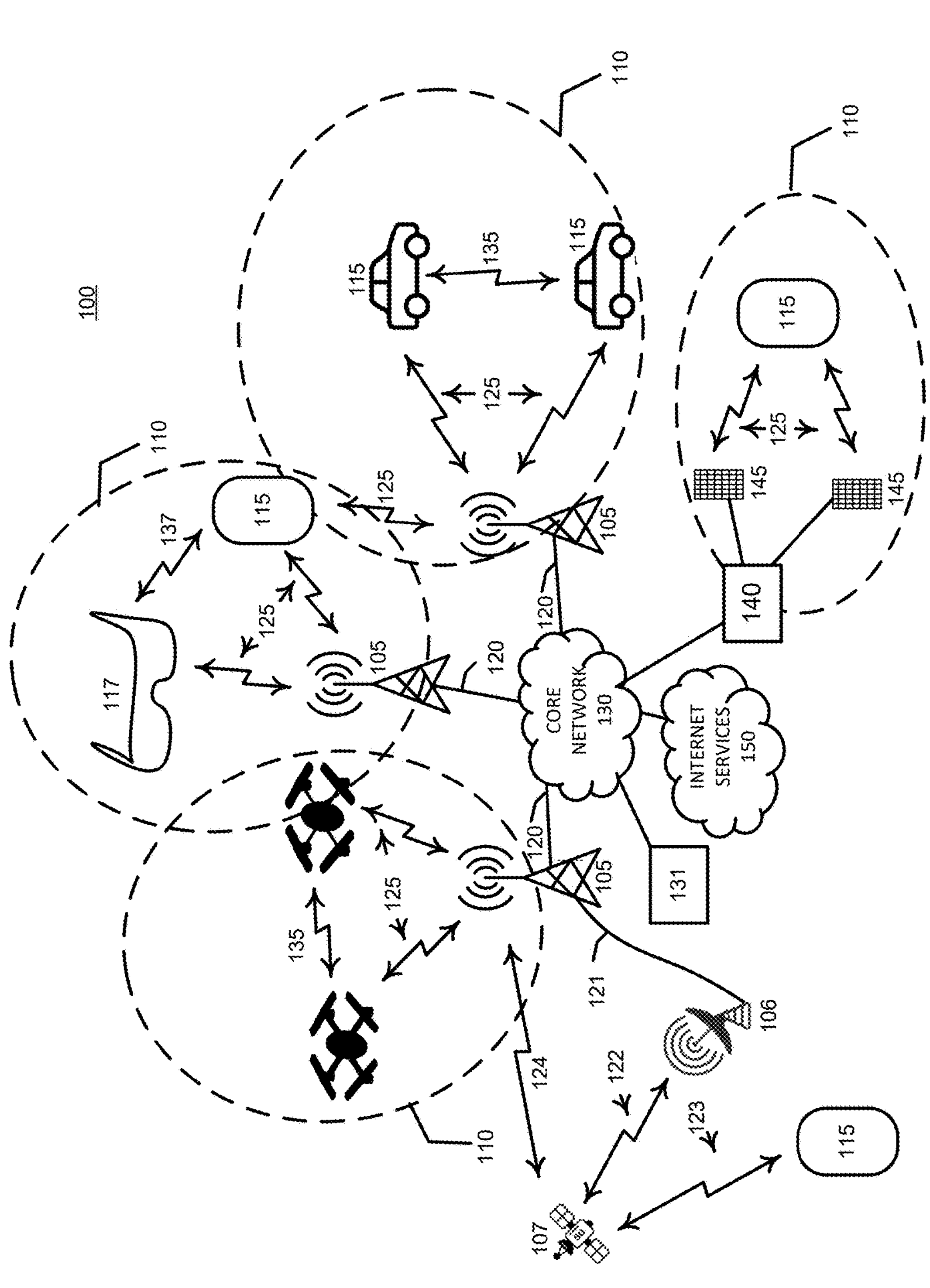
FIG. 1 illustrates an example wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Artificial intelligence ("AI") and machine learning ("ML") models may facilitate performance and operational functionality and improvements in 5G implementation, such as, for example, network automation, optimizing signaling overhead, energy conservation at devices, and traffic-capacity maximization. An artificial intelligence machine learning models ("AI/ML model") functionality can be implemented and structured in many different forms and with varying vendor-proprietary designs. A 5G radio access network node ("RAN") of a network to which the user equipment may be attached or with which the user equipment may be registered may manage or control real-time AI/ML model performance at different user equipment devices for various radio functions.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 17.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The evolution of communication networks has witnessed remarkable advancements over the past decades. A significant extension of 5G's potential may lie beyond the conventional terrestrial infrastructure, giving rise to what are known as Non-Terrestrial Networks ("NTN").

Non-Terrestrial Networks may encompass a diverse range of technologies and architectures that may comprise space-based, airborne, and maritime platforms to enhance global communication capabilities. Integration of 5G and non-terrestrial environments may facilitate connectivity being established, maintained, and optimized to remote and underserved regions.

Satellites equipped with 5G capabilities constitute an aspect of 5G NTN. Satellites, positioned in low Earth orbit ("LEO"), medium Earth orbit ("MEO"), or geostationary orbit ("GEO"), may form an intricate web of interconnected nodes. The satellites can provide widespread coverage, offering high-speed data connections, low latency communication, and global mobility. Satellites may facilitate broadband access in rural and remote areas, disaster-stricken regions, and on moving vehicles, ships, and aircraft, thus bridging the digital divide.

Satellite-based NTN can bridge connectivity gaps in remote and rural areas, provide disaster recovery communication, and offer enhanced coverage for maritime and aeronautical services. High-altitude platforms and drones equipped with cellular capabilities can serve as temporary network relays for events, emergencies, or areas with signal-strength coverage deficiencies. such applications may benefit not only traditional voice and data services but also for technologies, such as, for example, Internet of Things ("IoT"), wherein connectivity is typically a desirable, or a fundamental requirement.

A non-terrestrial base station 106, which may comprise a satellite antenna, may be coupled to core network 130. Non-terrestrial base station 106 may communicate with satellite NTN node 107, which may communicate with a user equipment 115. Non-terrestrial base station 106, which may be referred to as a non-terrestrial network gateway, and satellite NTN node 107 may facilitate delivering traffic corresponding to a radio access network, which may comprise RAN nodes 105, core network 130, backhaul links 120, and long-range wireless links 125, to user equipment that may be located beyond coverage of a RAN node 105. Links 121 between RAN nodes 105 and satellite base station/gateway 106 may comprise coaxial, fiber, or wireless links that may be similar to links 120. Links 122 and 124 to satellite node 107, and links 123 from satellite/node 107 to UE 115, may comprise line-of-sight microwave signal transmission. A UE 115 may be configured with at least one antenna, or at least one processor, to facilitate transmitting or receiving microwave signals to/from satellite node 107, and a user equipment so configured or designed may be referred to as a non-terrestrial network capable user equipment, an NTN-capable user equipment, or simply an NTN user equipment. Description herein of, or reference herein to, a radio node or a radio network node may be a description of or a reference to either a terrestrial RAN node 105, a non-terrestrial gateway 106, a non-terrestrial satellite node 107, or a combination of one or more of a terrestrial RAN node, a non-terrestrial gateway, or a non-terrestrial satellite. A terrestrial radio network node may be referred to as a "TN" node. Reference to a satellite node, or a non-terrestrial network node ("NTN node"), may comprise a reference to satellite 107, base station gateway 106, or a combination of satellite 107 and base station/gateway 106.

Core network 130 may comprise, or may be communicatively coupled with, shared core entity 131, which may be referred to as a shared core entity node or a shared core node. Shared core entity 131 may be associated with TN node 105 or NTN node 107 and may facilitate unified interfacing among TN node 105, NTN node 107, and elements of core network 130. For example, TN node 105 and NTN node 107 may not be configured to communicate directly with one another due to different communication protocols, due to absence of direct communication links therebetween, due to configuration incompatibility (e.g., NTN satellite node 107 and TN RAN node 105 being operated by different entities that have declined to configure equipment corresponding to the different entities to interoperate with each other), or due to other reasons. Accordingly, shared core entity 131 may be configured to facilitate joint scheduling, joint interference detection, joint operation of coordination algorithms, or other joint operations between RAN node 105 and NTN node 107. Shared node 131 may facilitate maintaining of user equipment information privacy with respect to RAN node 105 or NTN node 107 that may be operated by a different operator or service provider than an operator or provider with which the user equipment is subscribed to operate. Shared core entity 131 may facilitate executing software instructions that may be provided by an entity other than an operator of NTN node 107 or TN RAN node 105, and thus may facilitate efficient TN-NTN system integration without private terrestrial network information being shared with a non-terrestrial network, and vice versa.

It will be appreciated that although an NTN node may benefit the most from embodiments disclosed herein, techniques disclosed herein may be of benefit to a ground-based RAN node. Thus, use of "radio network node" may be interpreted as referring to a ground-based RAN node or to a satellite node, which may comprise a gateway 106 or a satellite 107.

NTNs can enhance the limited coverage of ground RANs, which makes NTNs cost efficient in remote rural areas, mountainous areas, and generally where ground cellular deployments are either not possible or not cost efficient.

Figure 2:
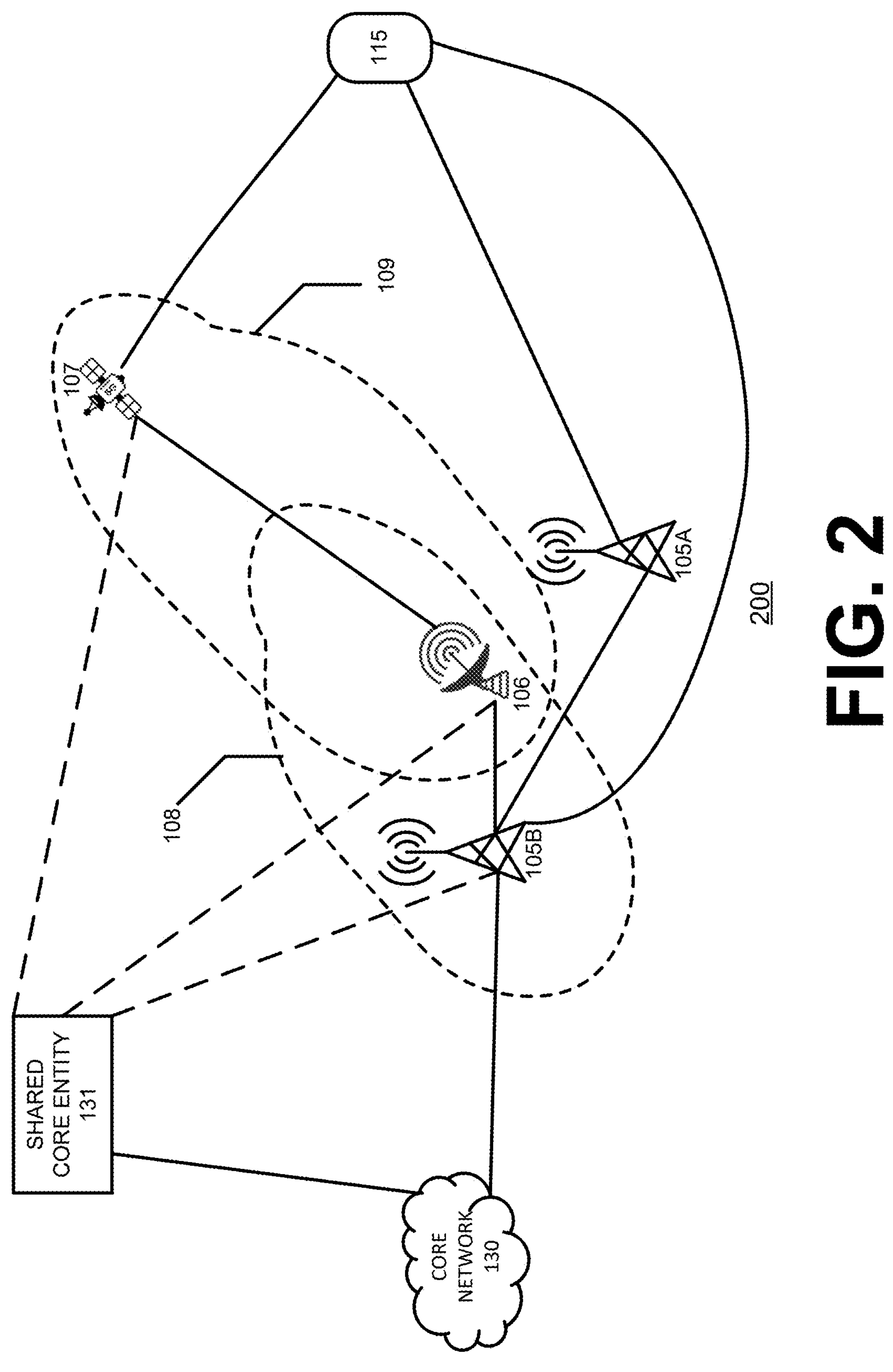
FIG. 2 illustrates an example environment with a satellite base station/gateway and satellite that are capable of communication of traffic corresponding to a radio access network.

Turning now to FIG. 2, the figure illustrates ground-based RAN node 105, base station 106, and NTN node 107, any one or more of which may be referred to as a radio network node. In reference to some embodiments disclosed herein, reference to a TN node may comprise a reference to node 108, which may comprise one or more of terrestrial RAN node 105 or gateway 106. In reference to some embodiments disclosed herein, reference to an NTN node may comprise a reference to node 109, which may comprise one or more of gateway 106 or satellite 107. In some embodiments, a communication session with UE 115 may be served by RAN node 105. RAN node 105 may communicate directly with satellite node 107 via communication links 124 or via gateway 106 via links 121 and 122.

It may be desirable to implement gNodeB/RAN node functionality on board a non-terrestrial node/satellite node to serve user equipment. However, due to the nature of cellular-like NTN connectivity that differs from terrestrial/ground connectivity in terms of a much larger coverage footprint, signal propagation characteristics with respect to a non-terrestrial radio network node as compared to signal propagation characteristics with respect to a terrestrial radio network node may vary due to variations in position or speed of a satellite (e.g., a satellite may be a vehicle that carries a non-terrestrial radio network node) relative to terrestrially-located user equipment. Accordingly, NTN-native procedures may address challenges introduced by use of NTN nodes to communicate with user equipment. Conventional non-terrestrial-network-focused techniques differ from conventional terrestrial-focused techniques, insofar as, according to the conventional NTN-focused techniques, NTN RAN nodes are mandated to periodically broadcast a special system information block ("SIB"), for example via a SIB19 message, that comprises updated, almost real-time, satellite ephemeris information, for example updated satellite relative position, updated average detected timing advance corresponding to a geographic region, and the like. Updated ephemeris information may facilitate non-terrestrial-network-capable user equipment (e.g., user equipment that are configured or designed to communicate with an NTN RAN node according to non-terrestrial frequency or time resources) that are located at or near the ground being always updated with the latest, most recent ephemeris information corresponding to a serving NTN RAN node. Updated ephemeris information may facilitate a user equipment updating propagation and transmission parameters corresponding to communication with the NTN RAN node to always match current positions and perceived radio conditions corresponding to a serving/target NTN RAN node. The need to update information that may vary according to location of a RAN does not exist with respect to terrestrial RAN nodes due to the static location and semi-static, or almost static, propagation characteristics corresponding to terrestrial RAN nodes that result from a TN RAN node having a fixed location.

However, conventional NTN ephemeris SIB broadcast procedures assume that NTN-capable user equipment devices are always able to detect and receive, and actually always detect and receive, every ephemeris SIB that is broadcast by an NTN node that the user equipment has selected or is connected to. According to conventional techniques, such an assumption is applicable to full duplex user equipment devices that can simultaneously receive downlink traffic and transmit uplink traffic.

Moreover, the assumption, according to conventional techniques, that a user equipment is to always receives ephemeris information broadcast by an NTN node via an ephemeris SIB message is applicable to half-duplex user equipment devices with a single transceiver chain that can either receive downlink traffic or transmit uplink traffic, but that cannot simultaneously transmit and receive traffic and that is/are not triggering, or actually transmitting, uplink traffic during an ephemeris SIB occasion. For example, when a downlink ephemeris SIB19 message is broadcast during a period that overlaps active transmission of uplink traffic being transmitted by a half-duplex NTN-capable user equipment device, the half-duplex user equipment can either receive the ephemeris SIB message, thus facilitating updating of NTN propagation settings corresponding to the NTN node that broadcast the ephemeris SIB message, or the half-duplex user equipment can continue the ongoing transmission of uplink traffic. Therefore, a problem that exists with respect to conventional techniques is that if a half-duplex user equipment skips detection or reception of ephemeris SIB information, an NTN link between the user equipment and the NTN node may degrade or completely fail. On the other hand, if the half-duplex user equipment pauses an ongoing transmission to an NTN node of uplink traffic (transmission of uplink traffic to an NTN node is typically spread over longer time durations as compared to transmission of traffic to a TN node due to the much larger distance to NTN RAN nodes) to receive ephemeris information that is broadcast by the NTN node, capacity of a non-terrestrial radio link between the user equipment and the non-terrestrial node may be reduced and uplink radio latency may be increased.

Thus, according to conventional techniques, a half-duplex user equipment that is actively transmitting uplink traffic to a non-terrestrial node when the NTN node broadcasts ephemeris information experiences a dilemma: avoid pausing uplink traffic transmission to receive updated ephemeris information and risk radio link failure or pause uplink traffic transmission to receive updated ephemeris information and cause link capacity reduction and/or increase traffic delivery latency. According to conventional techniques, all ephemeris SIB broadcast instants are treated as equally important and necessary by an NTN-capable user equipment device because the user equipment does not have information indicative of whether a particular ephemeris SIB message will convey ephemeris information that differs significantly from a previously-received ephemeris SIB message that the user equipment may have received, which previously-received ephemeris SIB message may have been received during a period of uplink traffic inactivity. For example, with respect to broadcast of a previous ephemeris SIB message, a distance from a satellite that carries an NTN node that broadcast the previous ephemeris SIB message may not have changed an amount, relative to a user equipment, when the NTN node broadcasts a current ephemeris SIB message, or the satellite may not predict a change in distance relative to the user equipment by the time the NTN node is to broadcast an upcoming ephemeris SIB message, that may correspond to a change in a timing advance value used by the user equipment to maintain operation of a radio link with the NTN node that is enough to result in a failure of the radio link. However, according to conventional techniques, user equipment devices prioritize reception of ephemeris SIB messages broadcast by NTN nodes and thus preemptively halt/stop ongoing uplink transmissions to facilitate receiving of ephemeris SIB information broadcast by an NTN node.

To address one or more problems that exist with respect to conventional techniques, according to embodiments disclosed herein, an ephemeris SIB message broadcast by an NTN node may be associated with a detection priority assigned by the NTN node. The detection priority may be determined based on rate of change of ephemeris information, corresponding to an ephemeris SIB message, with respect to ephemeris information corresponding to a previously-broadcast SIB message. Such an assigned-priority ephemeris SIB message may guide NTN-capable use equipment in determining whether detection of an ephemeris SIB message important enough to pause transmission of uplink traffic to receive the ephemeris SIB message. For example, for a first ephemeris SIB broadcast group having a higher assigned priority than a second ephemeris SIB broadcast group, an NTN-capable user equipment may determine to stop/halt/pause transmission of uplink traffic to receive an ephemeris SIB message broadcast during an ephemeris SIB group occasion associated with the first ephemeris SIB broadcast group but the user equipment may determine to avoid pausing uplink transmission to receive an ephemeris SIB message broadcast during an ephemeris SIB group occasion associated with the second ephemeris SIB broadcast group. The user equipment may determine that the ephemeris information indicated by the first SIB group occasion may have been substantially changed compared to ephemeris information indicated by a previously-received ephemeris SIB message such that pausing transmission of uplink traffic is warranted wherein the user equipment may determine that the lower priority associated with the second ephemeris SIB group occasion may not justify pausing transmission of uplink traffic to receive ephemeris information indicated via the second ephemeris SIB group occasion. The user equipment may determine whether pausing transmission of uplink transmission to receive an ephemeris SIB message is justified based on analysis of an assigned priority, associated with the SIB occasion, or associated with SIB occasion group that comprises the SIB occasion, with respect to an asynchronization tolerance, or criterion, that may be configured and that may be specifically associated with the user equipment. Accordingly, NTN-capable user equipment devices may prioritize detection and downlink reception over ongoing or active transmission of uplink traffic based on a priority, corresponding to an ephemeris SIB occasion, assigned by an NTN node. Thus, capacity cost, due to skipping/halting/stopping ongoing uplink transmission that are scheduled to be time-overlapping with downlink broadcast of ephemeris SIB messages may only be experienced for reception of ephemeris SIB messages that have an assigned priority that a user equipment uses to determine that disadvantages associated with pausing transmission of uplink traffic are outweighed by advantages of obtaining updated ephemeris information.

According to embodiments disclosed herein, unlike conventional techniques, a user equipment may dynamically determine whether to avoid transmission of uplink traffic to receive ephemeris information via an ephemeris SSB message broadcast during a time that overlaps scheduling for the transmission of the uplink traffic based on whether a maximum potential change of the ephemeris information, as indicated by a priority corresponding to the SSB message, is within a timing, frequency, or location misalignment change tolerance (e.g., an asynchronization criterion) that may be specific to the user equipment. Therefore, not all ongoing uplink traffic transmissions to an NTN node that are scheduled to overlap in time with ephemeris SIB messages are skipped, thus resulting in improved overall NTN uplink capacity or latency as compared to pausing all uplink traffic transmission to receive every ephemeris SIB message broadcast by an NTN node.

According to conventional techniques, SIB message broadcast procedures require that SIB information is always periodically broadcast without a requirement that a priority that corresponds to changeable conditions be indicated. According to embodiments disclosed herein, a non-terrestrial radio network node may assign a detection priority to a group of SIB message occasions. The assigned priority may be based on how much ephemeris information changes, or is anticipated by the NTN node to change, with respect to corresponding information indicated by an ephemeris SIB message previously-broadcast by the NTN node, to facilitate a particular user equipment determining, based on criterion specific to the particular user equipment, whether detection of an upcoming ephemeris SIB occasion justifies pausing scheduled transmission of uplink traffic.

According to conventional techniques, user equipment always attempt(s) to detect and receive ephemeris SIB message occasions based on an assumption that every ephemeris SIB message contains ephemeris parameter information that is necessary for user equipment to be configured with to maintain non-terrestrial radio link operation. Instead, according to embodiments disclosed herein, making a using equipment 'aware' of a priority, assigned by an NTN node, to an upcoming ephemeris SIB message occasion, or a group of ephemeris SIB occasions, may facilitate a user equipment determining to receive ephemeris information based on importance to the user equipment that is determined based on whether expected radio parameter changes conveyed by a particular ephemeris SIB message can be tolerated by the device without jeopardizing integrity of a radio link with the NTN node. Thus, a user equipment may only experience disadvantages resulting from processing and detecting an ephemeris SIB message if the user equipment determines that an assigned priority, associated with the ephemeris SIB message, corresponds to ephemeris information that has changed relative to ephemeris information received in a previously received ephemeris SIB message to an extent that the user equipment cannot tolerate the change represented by the changed information without potentially causing a radio link failure.

Priority-Aware Non-Terrestrial Broadcast Information Delivery

Figure 3:
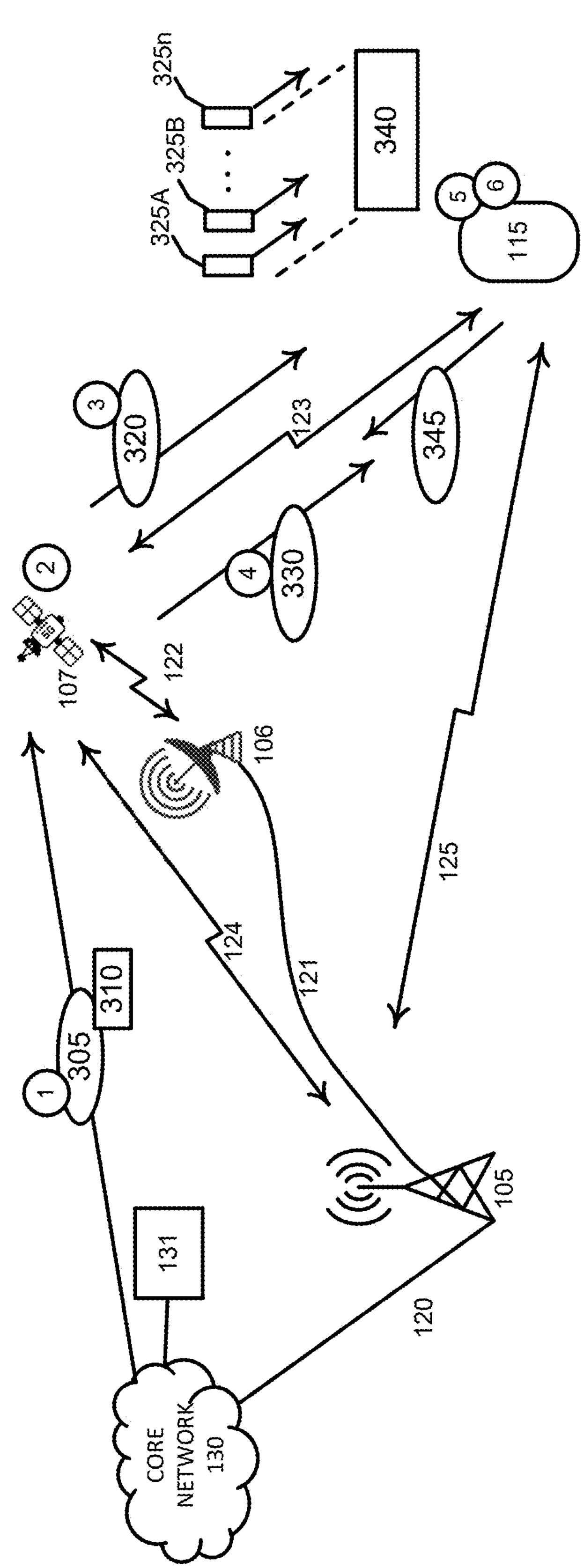
FIG. 3 illustrates an example environment with use of ephemeris information based on priority corresponding to ephemeris system information block priority.
Figure 5:
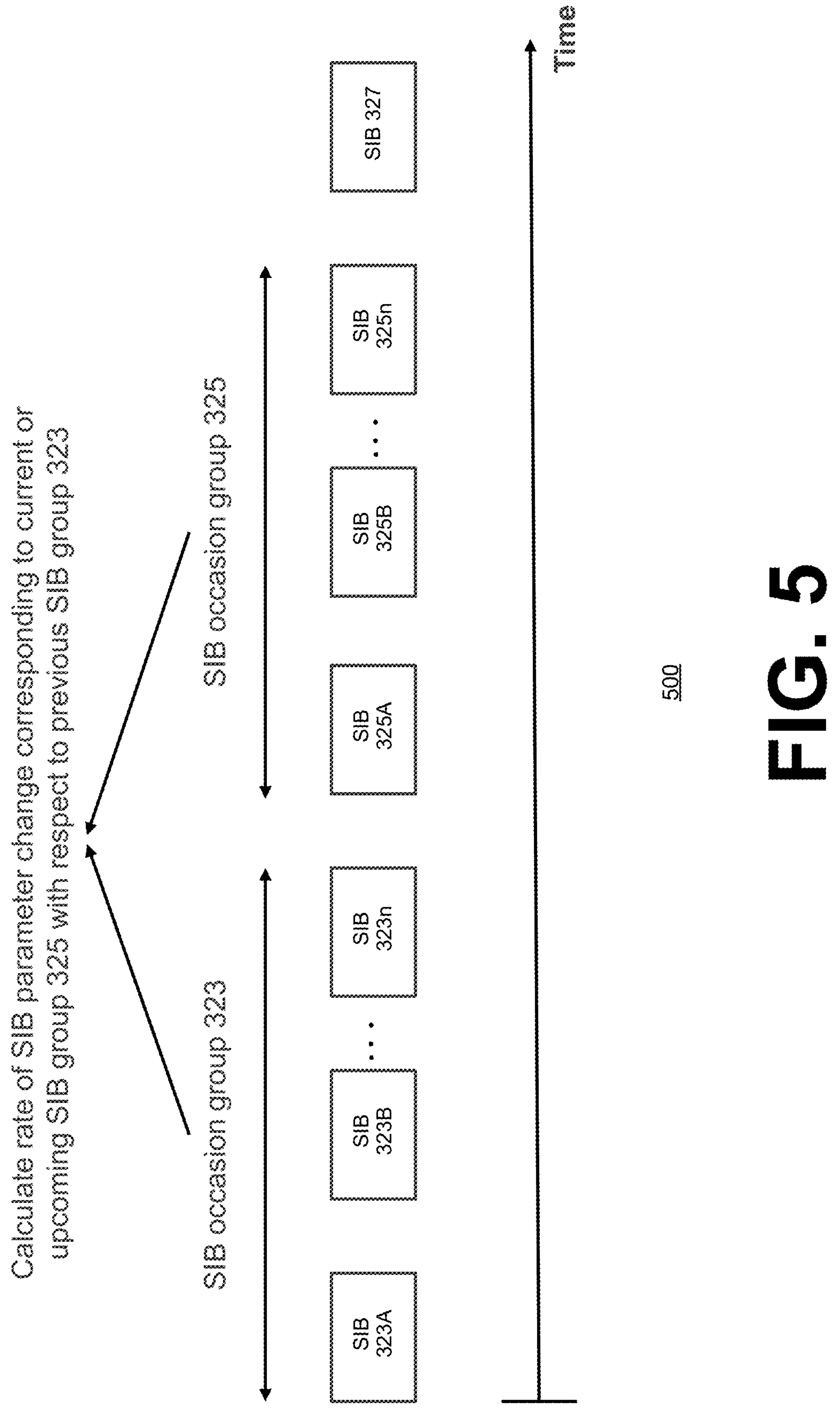
FIG. 5 illustrates example ephemeris system information block groups.

Turning now to FIG. 3, the figure illustrates an environment 300 with a user equipment 115 and non-terrestrial radio network node 107. At act 1, NTN node 107 may receive, from an element of core network 130, from shared core network element 131, from NTN node 105, or from gateway 106, at least one ephemeris system information block priority configuration information message 305 comprising ephemeris system information block information 310 (e.g., information shown in FIG. 4). At act 2, non-terrestrial radio network node 107 may determine or assign at least one system information block priority to at least one ephemeris system information block group 325 (multiple ephemeris SIB groups, or SIB occasion groups, are shown in FIG. 5). At least one SIB priority 605 (shown in FIG. 6) from ephemeris system information block information 310 may be assigned to result in at least one assigned system information block priority corresponding to the at least one ephemeris system information block group 325, wherein the at least one ephemeris system information block group may comprise at least one ephemeris system information block 325A, 325B, . . . 325*n*.

At act 3, non-terrestrial radio network node 107 may transmit, to at least one user equipment 115, a system information block priority configuration information message 320. Message 320 may comprise similar information 410 as shown in FIG. 4. At act 4, non-terrestrial radio network node 107 may transmit to the at least one user equipment 115 an ephemeris system information block priority indication message 330 indicative of at least one assigned system information block priority assigned, by the NTN node, to the at least one ephemeris system information block group. The at least one assigned SIB priority indication may be usable by user equipment 115 at act 5 to determine an ephemeris parameter value range, associated in information received via message 320, corresponding to the at least one ephemeris system information block group 325 indicated in field 705 of ephemeris SIB priority indication message 330 transmitted. Message 305 and message 320 may both be referred to as ephemeris system information block priority configuration information messages.

Figure 7:
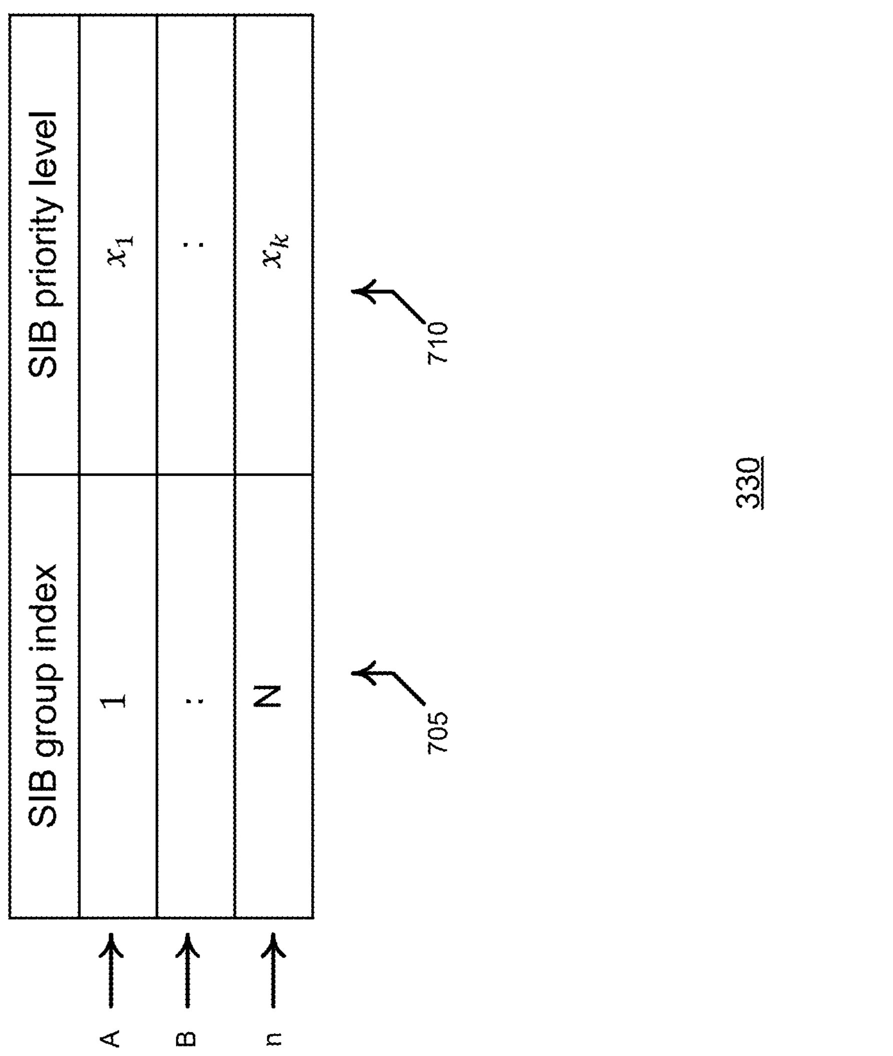
FIG. 7 illustrates an example system information block priority information message indicative of system information block priorities corresponding to ephemeris system information block groups.

In field 710 shown in FIG. 7, message 330 may comprise at least one ephemeris SIB occasion group priority indication indicative of at least one assigned SIB group priority, respectively associated with at least one SIB occasion group (e.g., group 325) indicated in field 705, determined by NTN node 107 at act 2. Based on the at least one assigned system information block priority indicated in message 330, at act 5, user equipment 115 may determining at least one assigned system information block priority criterion to result in at least one determined assigned system information block criterion. For example, if a priority indicated in message 330 is $x_3$, UE 115 may determine upper range value $y_3$ from field 610C in information 410 received in message 320 as the at least one determined assigned system information block criterion. UE 115 may analyze the at least one determined assigned system information block criterion (e.g., upper value $y_3$) with respect to a timing asynchronization criterion, which may be specific to the UE, to result in at least one analyzed determined assigned system information block criterion.

In an example, the configured UE-specific reception criterion/asynchronization criterion may comprise a criterion such that satisfaction of the criterion facilitates an end-to-end synchronization (e.g., the user equipment being synchronized with a component of core network 130), and may be a time value, for example, 1.5 milliseconds. The configured UE-specific reception criterion may be referred to as an asynchronization criterion insofar as the UE-specific reception criterion may be indicative of an allowable amount of asynchronization between the user equipment and the non-terrestrial node that will likely not result in failure of link(s) 123. The configured UE-specific reception/asynchronization criterion may be determined by information provided by a service provider operating any one of nodes 105, 106, or 107, shared core element 131, or a component of core network 130. The configured UE-specific reception/asynchronization criterion may be based on a quality of a particular user equipment, for example radio transceiver quality, antenna quality, or processor capability. The configured UE-specific reception/asynchronization criterion may be determined by a manufacturer of the user equipment or a manufacturer of a component of the user equipment and may be configured to the user equipment when the user equipment is manufactured or when the component with respect to which the reception/asynchronization criterion is determined or based on is manufactured. At act 6, user equipment 115 may determine whether to receive, based on the at least one assigned system information block priority (e.g., a SIB priority assigned at act 2 and indicated by NTN node 107 to UE 115 via message 330 at act 4), ephemeris information 340, corresponding to the non-terrestrial radio network node, via at least one ephemeris system information block occasion 325.

Figure 6:
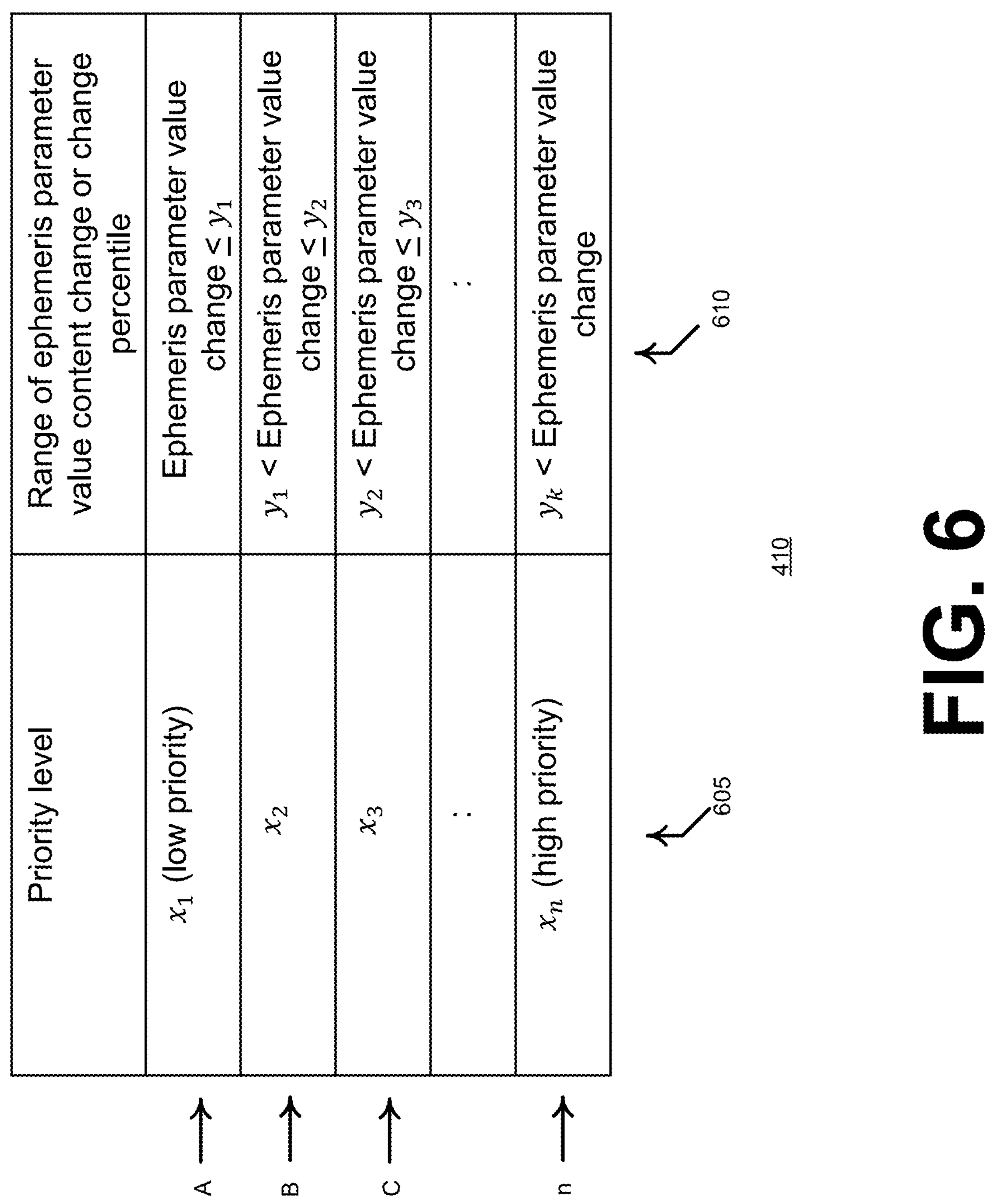
FIG. 6 illustrates example ephemeris parameter difference criteria associated with system information block priorities.

User equipment 115 may determine, based on the at least one analyzed determined assigned system information block criterion (e.g., an upper value of a change range corresponding to a priority indicated in message 330) satisfying the configured user-equipment-specific reception criterion, to avoid receiving ephemeris information 340 via a system information block 325A-325*n* associated with system information block group 325 with respect to which the assigned system information block priority corresponds. User equipment 115 may determine, based on the at least one analyzed determined assigned system information block criterion failing to satisfy the user-equipment-specific configured ephemeris reception criterion, to receive ephemeris information 340 via a system information block 325A-325*n* associated with a system information block group with respect to which the assigned system information block priority corresponds. For example, if, based on analysis of a range 610 associated with a priority 605 in information 410 that corresponds to a priority indicated in message 330, the upper end, or upper value, of the range is less than the UE-specific configured reception criterion, the user equipment may avoid receiving ephemeris information via a SIB19 message (e.g., if priority corresponding to SIB group 325 in message 330 is $x_2$, if $y_2$ in field 610B shown in FIG. 6 is less than an allowable asynchronization criterion, UE 115 may avoid receiving ephemeris information via a SIB group occasion of SIB group occasion group 325).

Ephemeris system information block (e.g., SIB19) priority configuration information 310 received via message 305 at act 1 shown in FIG. 3 may comprise, in field 405, NTN SIB group timing window information as shown in FIG. 4. Information in field 410 may be indicative of a time window, or period, encompassing several, for example ten, consecutive SIB occasions or indicative of a timing window/period of a defined period (e.g., 400 seconds). In field 410, information 310 may comprise at least one SIB priority, or priority level, level, indicated in at least one field 605 shown in FIG. 6. A SIB priority level indicated in field(s) 605 may be associated with parameter range in respective field 610. A range indicated in field 610 may correspond to an upcoming ephemeris parameter value determined by NTN node 107. NTN node 107 may determine a parameter change value, for example a timing advance rate of change value, corresponding to upcoming ephemeris SIB group with respect to a previous, or preceding, ephemeris SIB group. Instead of transmitting an actual rate of change value, NTN node 107 may transmit to user equipment a priority corresponding to a range that encompasses the rate of change value. For example, a SIB occasion group may be assigned, by NTN node 107, a SIB priority level due to the NTN RAN node determining an average timing advance rate of change of an average timing advance value corresponding to NTN SIB occasions of group 325 compared to an average timing advance corresponding to SIB occasion group 323 (shown in FIG. 5), that falls within a range indicated in field 410 of information 310. For example, 60%+/−timing advance rate of change determined by comparing at least one timing advance value corresponding to SIB group 325 with respect to an average timing advance value corresponding to SIB group 323 may result in NTN node 107 determining a priority $x_3$ indicated in field 605C, shown in FIG. 6, if 60% is greater than $y_2$ and less than or equal to $y_3$ indicated in field 610C. NTN RAN node 107 may calculate, or determine, a current value for one or more SIB parameters with respect to each SIB occasion of a current SIB occasion group (e.g., NTN node 107 may calculate different timing advance values for each of occasions 325A-325*n*). NTN node 107 may determine values with respect to occasions 325 for parameters other than timing advance, for example, average frequency or doppler shift, or relative NTN RAN node location. NTN node 107 may determine different parameter values for different regions. Thus, NTN node 107 may determine different parameter values for different geographic regions, even for the same SIB group, to facilitate a user equipment receiving a priority indication, via a message 330, associated with a SIB group that may be tailored to a location where the user equipment is located.

NTN RAN node 107 may apply one or more functions to determined parameter change values. For example, node 107 may average or filter configured SIB parameter values with respect to each of one or more SIB occasion group(s) and determine a corresponding single value for each configured NTN SIB parameter with respect to a current SIB occasion group. NTN RAN node 107 may calculate and determine a change rate and/or change value with respect to each of one or more configured NTN SIB parameters for a current SIB occasion group (e.g., group 325) as compared to a previous, or preceding, SIB occasion group (e.g., group 323). On condition of, or based on, determining at least one SIB parameter change value, associated with at least one SIB parameter, corresponding to an ephemeris SIB group, NTN node 107 may assign a SIB priority to the ephemeris SIB group to result in an assigned SIB priority corresponding to the ephemeris SIB group. NTN node 107 may transmit, to user equipment 115, a SIB priority information message 330 indicative of the assigned SIB priority corresponding to the ephemeris SIB group.

On condition of receiving a SIB priority request message from UE 115 345, or upon expiration of a configured SIB priority broadcast periodicity, NTN RAN node 107 may broadcast updated SIB detection priority information (e.g., a message 320 comprising updated information with respect to a previously transmitted/broadcast message 320) via downlink NTN radio interface link(s) 123. An updated message 320 may comprise similar information as a previous message 320, but ranges indicated in fields 410 may be revised to account for movement of NTN node 107 relative to the surface of the Earth or a region thereon, or may be based on information available to core network equipment, such as quality-of-service relative to a traffic flow, relative to weather conditions, relative to a time of day, or other factor. Updated information in an updated message 320 may comprise updated SIB priority levels and associated ranges of SIB parameter changes or change percentiles, and/or SIB occasion group indications and associated updated SIB group-specific priority levels. Transmitting of updated SIB priority information may be triggered by expiration of a configured SSB priority broadcast period/timer or by reception by NTN RAN node 107 of a SIB priority request 345 transmitted by NTN-capable user equipment 115 that may not have previously detected up-to-date SIB priority information.

Figures 8A, 8B:
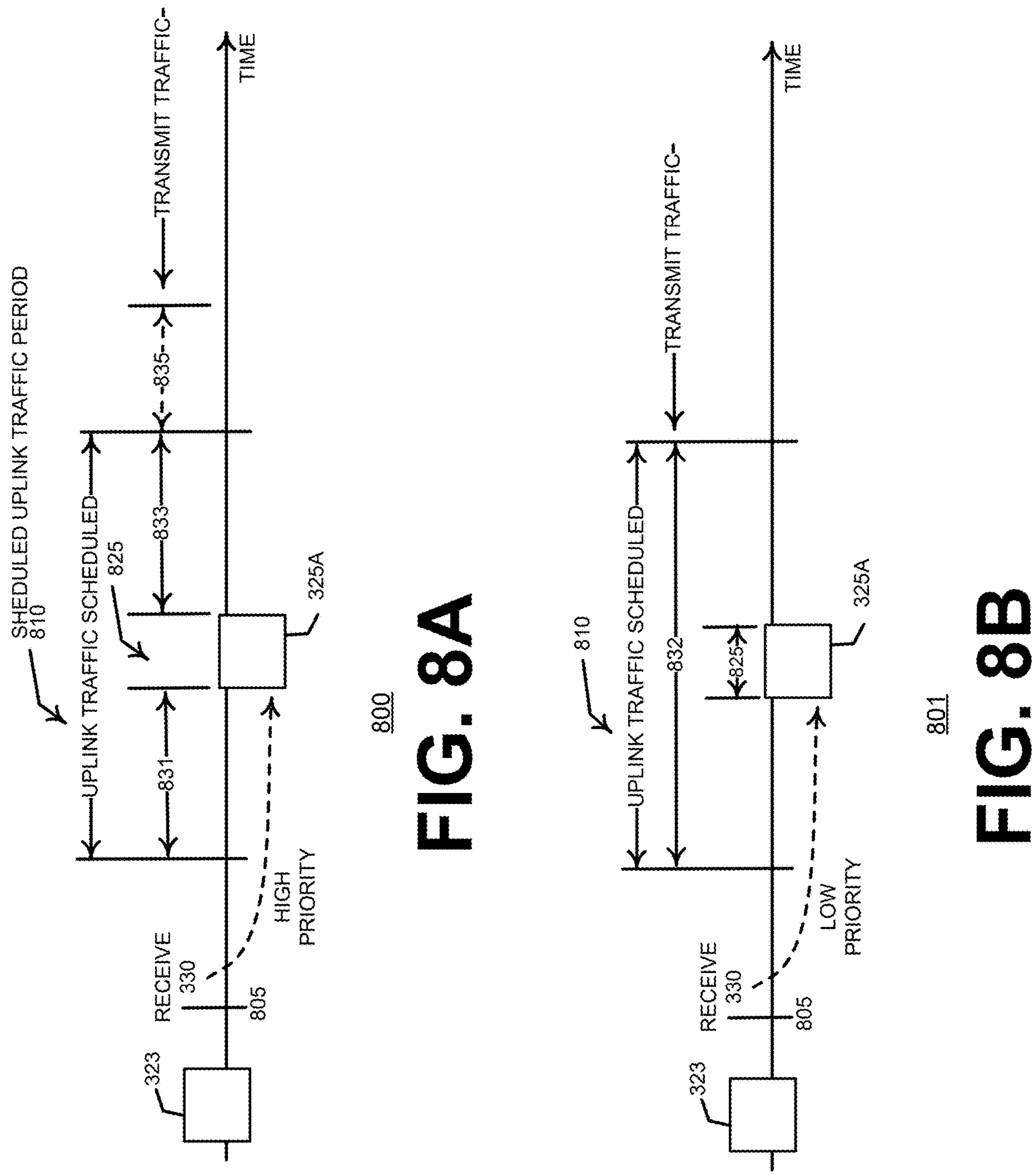
FIG. 8A illustrates an example embodiment wherein a user equipment determines to receive ephemeris information.
FIG. 8B illustrates an example embodiment wherein a user equipment determines to skip receiving of ephemeris information.

Turning now to FIG. 8A, the figure illustrates an example embodiment wherein a user equipment 115 determines not to skip receiving of ephemeris information based on an ephemeris system information block group priority corresponding to failure to satisfy a user-equipment-specific asynchronization criterion. User equipment 115 may determine that SIB19 occasion period 825, which may correspond to SIB group 325 (e.g., period 825 shown in FIG. 8A may be a period 825A corresponding to a SIB occasion 325A of SIB group 325) and which may be referred to as an overlap period, coincides with, or overlaps, scheduled uplink transmission of traffic during scheduled uplink transmission traffic period 810. Based on receiving, at time 805 after SIB group occasions corresponding to SIB group 323, a message 330 that is indicative of a 'high' priority corresponding to SIB group 325 (e.g., an indicated priority may be 'high' if the priority corresponds to a range having an upper value that fails to satisfy the UE-specific asynchronization criterion), user equipment 115 may halt uplink transmission of traffic after first transmission period 831, may receive ephemeris information relative to NTN radio node 107 during ephemeris reception period 825, and then may resume transmission of uplink traffic during second transmission period 833. The user equipment may determine a priority indicated by message 330 as 'high' if a maximum value of a range corresponding, in information 410 received via message 320, to the priority indicated in message 330 exceeds a maximum allowable asynchronization tolerance value that may be configured in the user equipment for purposes of determining whether to receive ephemeris information via a SIB group occasion according to embodiments disclosed herein or that is configured for other operational purposes. It will be appreciated that if the user equipment halts, or suspends, transmission of uplink traffic to receive ephemeris information during period 825, the user equipment may transmit uplink traffic, that may have been scheduled for transmission during period 810, during third transmission period 835, which may have a duration less than, equal to, or greater than period 825.

FIG. 8B illustrates an example wherein a user equipment 115 determines to avoid receiving ephemeris information based on an ephemeris system information block group priority being determined to satisfy a UE-specific asynchronization criterion. User equipment 115 may determine that SIB19 occasion period 825, which corresponds to SIB group 325 (e.g., period 825 shown in FIG. 8B may be a period 825A corresponding to a SIB occasion 325A of SIB group 325), coincides with, or overlaps, uplink transmission of traffic during scheduled uplink transmission traffic period 810. However, based on receiving, at time 805 after SIB group occasions corresponding to SIB group 323, a message 330 that is indicative of a 'low' priority corresponding to SIB group 325 or that is indicative of a priority corresponding to SIB group 825 that is not 'high', user equipment 115 may continue uplink transmission of traffic during a period that temporally overlaps occasion 325A after first transmission period 831 and may avoid reception of ephemeris information relative to NTN radio node 107 during ephemeris reception period 825. It will be appreciated that if a user equipment avoids receiving updated ephemeris information during occasion 325A, the user equipment may continue to communicate with a serving NTN node via link(s) 123 based on a timing advance, or other parameter value, that corresponds to a previous SIB occasion group, such as preceding occasion group 323. The user equipment may determine a priority indicated by message 330 as being 'low', or as being not 'high', if a maximum value of a range corresponding, in information 410 received via message 320, to the priority indicated in message 330 is equal to or does not exceed a maximum allowable asynchronization tolerance value, which may be referred to as a timing asynchronization criterion, or which may be end-to-end synchronization mismatch tolerance, that may be configured in the user equipment for purposes of determining whether to receive ephemeris information via a SIB group occasion according to embodiments disclosed herein or for other operational purposes.

Figure 9:
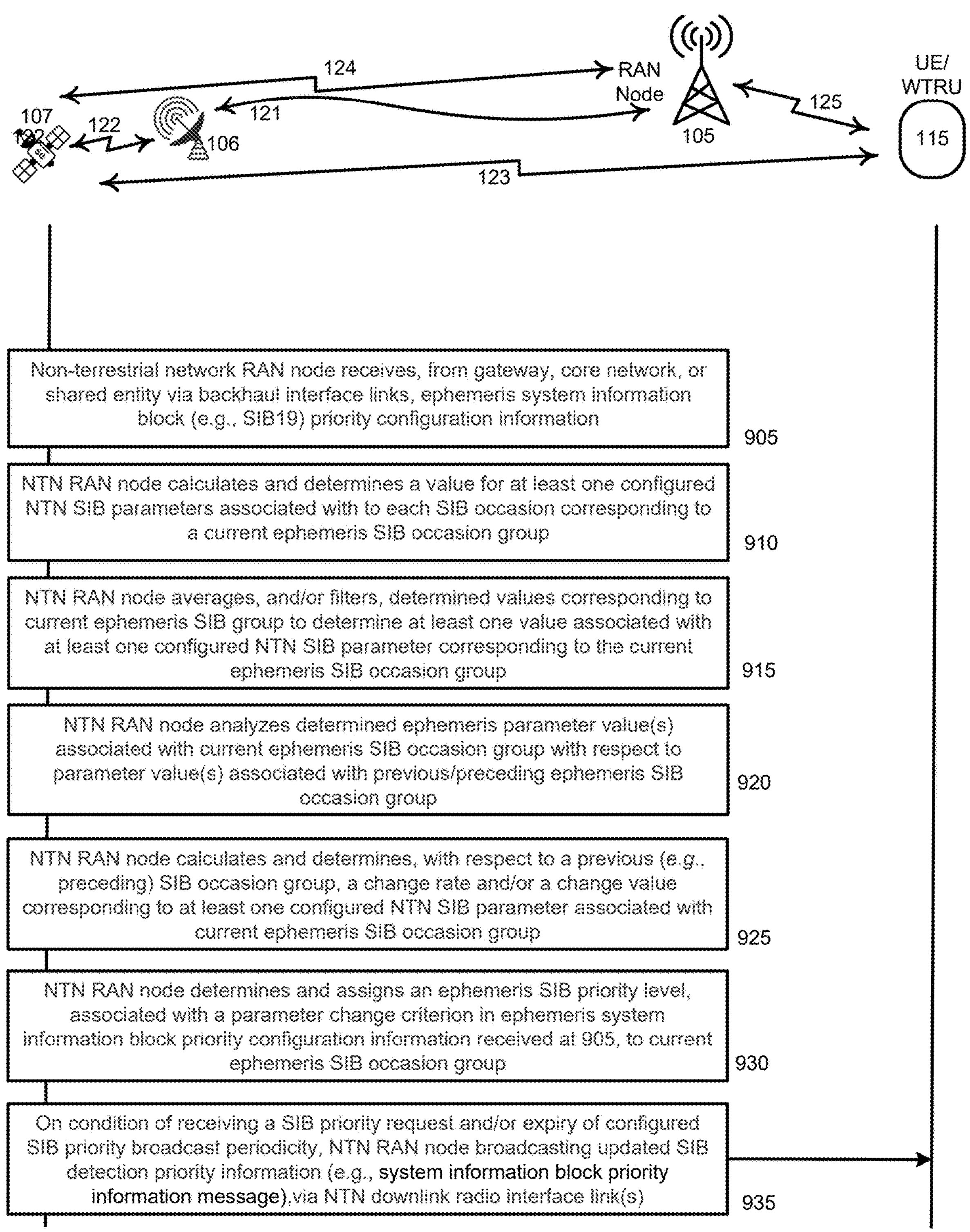
FIG. 9 illustrates an example timing diagram of a non-terrestrial radio network node facilitating updating a user equipment with ephemeris system information block group priority information.

Turning now to FIG. 9, the figure illustrates a timing diagram of an example method 900. At act 905, non-terrestrial RAN node/cellular satellite 107 may receive, from a non-terrestrial gateway, core network element, or shared core network element, via backhaul interface link(s), ephemeris system information block (e.g., SIB19) priority configuration information, such as, for example information 310 described in reference to FIG. 3. The ephemeris SIB priority configuration information may comprise NTN SIB group timing window information (e.g., time information indicative of a time window of ten consecutive SIB occasions and/or a timing window of 400 seconds). The ephemeris SIB priority configuration information may comprise at least one ephemeris SIB priority level that may be assignable to at least one upcoming SIB occasion group, wherein each SIB priority level may be associated with a certain range of change of a SIB19 ephemeris parameter of a current ephemeris SIB occasion group compared to a preceding ephemeris SIB group. For example, NTN node 107 may assign a SIB priority level to an ephemeris SIB occasion group comprising upcoming/future SIB occasions based on a rate of change of a common, or average, timing advance corresponding to the upcoming ephemeris SIB occasion group determined with respect to NTN ephemeris SIB occasions corresponding to a current (or previous) SIB occasion group, wherein the determined assigned SIB priority level corresponds to a change range that encompasses the rate of change of the timing advance as determined by NTN node 107.

At act 910, NTN RAN node 107 may calculate or determine a current value for each of at least one configured NTN ephemeris SIB parameter for each of at least one SIB occasion corresponding to a current ephemeris SIB occasion group (e.g., an ephemeris SIB occasion group with respect to which all occasions, as indicated in information received at act 905, have not occurred or with respect to which a SIB group duration, for example 400 seconds, received at act 905, has not expired). At act 915, NTN RAN node 107 may average, and/or filter, at least one value with respect to at least one configured NTN ephemeris SIB parameter and with respect to each at least one occasion during a current SIB occasion group and NTN node 107 may determine, at act 920, a value corresponding to each of the configured NTN SIB parameters and associated with a current SIB occasion group. At act 925, NTN RAN node 107 may analyze, calculate, or determine a rate of change or a change value corresponding to each of at least one configured NTN SIB parameter associated with the current SIB occasion group with respect to a value corresponding to the same at least one parameter determined corresponding to a previous/preceding SIB occasion group.

At act 930, NTN RAN node 107 may determine an ephemeris SIB priority level associated, in information received at act 905, with a range of change corresponding to NTN downlink interface link(s) 123 as determined at act 920 and assign the priority level to the at least one upcoming ephemeris SIB occasion group with respect to which the range of change was determined at act 920. On condition of receiving an SIB priority request and/or expiration of a configured ephemeris SIB priority broadcast periodicity, at act 935 NTN RAN node 107 may broadcast updated SIB detection priority level information, via downlink NTN radio interface link(s), indicative of at least one SIB priority level. The updated information may comprise updated SIB parameter change ranges or change percentages, or at least one SIB occasion group indication, or at least one associated updated SIB group-specific priority level.

Priority-Aware Non-Terrestrial Broadcast Information Detection

Returning to description of FIG. 3, at act 3 NTN-capable user equipment 115 may receive, from selected and/or serving NTN RAN node 107, via downlink NTN radio interface link(s) 123, SIB detection priority configuration information, which may comprise updated SIB detection priority information, via message 320 and via downlink NTN radio interface link(s) 123. (Updated information may have been revised since transmission by NTN node 107 of a previous or initial message 320.) Information indicated by message 320 may be indicative of SIB priority levels and associated ranges of SIB parameter changes or change percentiles and/or SIB occasion group identifiers and associated updated SIB group-specific priority levels.

Priority level indication information 605 and associated parameter change range information 610 may be indicated to a user equipment via a message 320 or, in an example embodiment, via a message 330 along with assigned priority information. Each SIB priority level indicated in fields 605A-605*n* may be associated with a determined or configured range of change of any of one or more ephemeris parameters that may be delivered via SIB 19 messages. In a message 330 received by a user equipment from an NTN node, at least one assigned priority level may be indicated in at least one field 710 corresponding to at least one ephemeris occasion group that may be indicated in at least one respective field 705. An ephemeris SIB occasion group indicated in a field 705 may correspond to a current, or an upcoming, ephemeris SIB occasion group. An assigned priority indicated in a field 710 may be indicative of a priority associated with an ephemeris SIB occasion group indicated in respective field 705. In an example, a SIB occasion group may be assigned a SIB priority level by an NTN RAN node based on the NTN RAN node determining a rate of change of an average NTN timing advance for NTN SIB occasions corresponding to a current, or upcoming, SIB occasion group (e.g., group 325 shown in FIG. 5) with respect to an average timing advance value corresponding to a current, previous, or preceding, SIB occasion group (e.g., group 323) falling within, or satisfying, a range associated, in information transmitted in message 320, with the assigned priority.

Based on, or on condition of, determining a time-overlapping NTN downlink SIB occasion and an actively scheduled uplink transmission, (e.g., a transmission collision for a half-duplex NTN-capable user equipment), from field 710 in message 330 the user equipment may determine an assigned SIB detection priority level, or simply an assigned priority level, associated with a SIB occasion group, respectively associated in field 705 with the determined priority level, that comprises the colliding/time-overlapping SIB occasion. Based on the determined SIB detection priority level, the NTN-capable user equipment may determine a corresponding maximum possible SIB parameter (e.g., a maximum value of a timing advance range indicated in a field 610 that corresponds to the priority level determined to be associated with the SIB occasion group that comprises the overlapping SIB occasion) change value, rate of change value, or change percentage.

In an example embodiment, based on, or on condition of, the determined maximum possible SIB parameter (e.g., timing advance) change value, or change percentage value, of the range corresponding to the priority level associated with the ephemeris SIB occasion that overlaps with scheduling of transmission of uplink traffic by a half-duplex NTN-capable user equipment being determined to be less than or equal to a maximum tolerable timing advance asynchronization criterion specific to the user equipment, the NTN-capable user equipment may skip, or avoid, detecting and decoding the ephemeris SIB occasion determined to overlap, or collide with, the scheduling of transmission of the uplink traffic. The user equipment may avoid detecting or decoding of remaining SIB occasions corresponding to the SIB occasion group. The user equipment may continue transmission of pending uplink traffic according to the scheduling thereof that may temporally overlap with the remaining ephemeris SIB occasion group. Thus, uplink capacity is not impacted because the user equipment does not halt or stop uplink traffic transmission during the ephemeris SIB occasion group and user equipment link performance is not impacted, or at least not significantly impacted, because a maximum range change in an ephemeris parameter value corresponding to an associated SIB priority, indicated in message 330 as corresponding to the ephemeris SIB group with respect to which the user equipment avoiding receiving, corresponds to a parameter value change that the user equipment can tolerate without exceeding a configured asynchronization criterion.

In an example embodiment, on condition of a determined maximum possible SIB parameter change or change percentage value (e.g., an upper value of a range indicated in a field 610 corresponding to a priority indicated in a message 330) being determined by an NTN-capable half-duplex user equipment to be larger than a maximum tolerable UE/WTRU-specific timing asynchronization criterion, the user equipment may halt transmission of scheduled uplink traffic and may switch to a receive mode of operation and detect and decode one or more upcoming SIB occasions of a current, or upcoming, SIB occasion group, that may temporally overlap, or collide with, scheduling of transmission of uplink traffic, and defer transmission of uplink traffic. Avoiding, by a half-duplex NTN-capable user equipment, transmission of scheduled uplink traffic to facilitate receiving of ephemeris information via a SIB occasion may impact uplink capacity with respect to the user equipment due to the skipping, halting, or deferring of transmission of scheduled uplink traffic. However, such impact to uplink capacity only occurs if the user equipment determines that a change of ephemeris conditions has occurred that is more than the user equipment can tolerate and still maintain NTN radio link(s) 123 and thus avoiding receiving updated ephemeris information via a colling ephemeris SIB occasion would likely result in failure of the NTN radio link and the scheduled uplink traffic not being successfully transmitted by the user equipment anyway.

Figure 10:
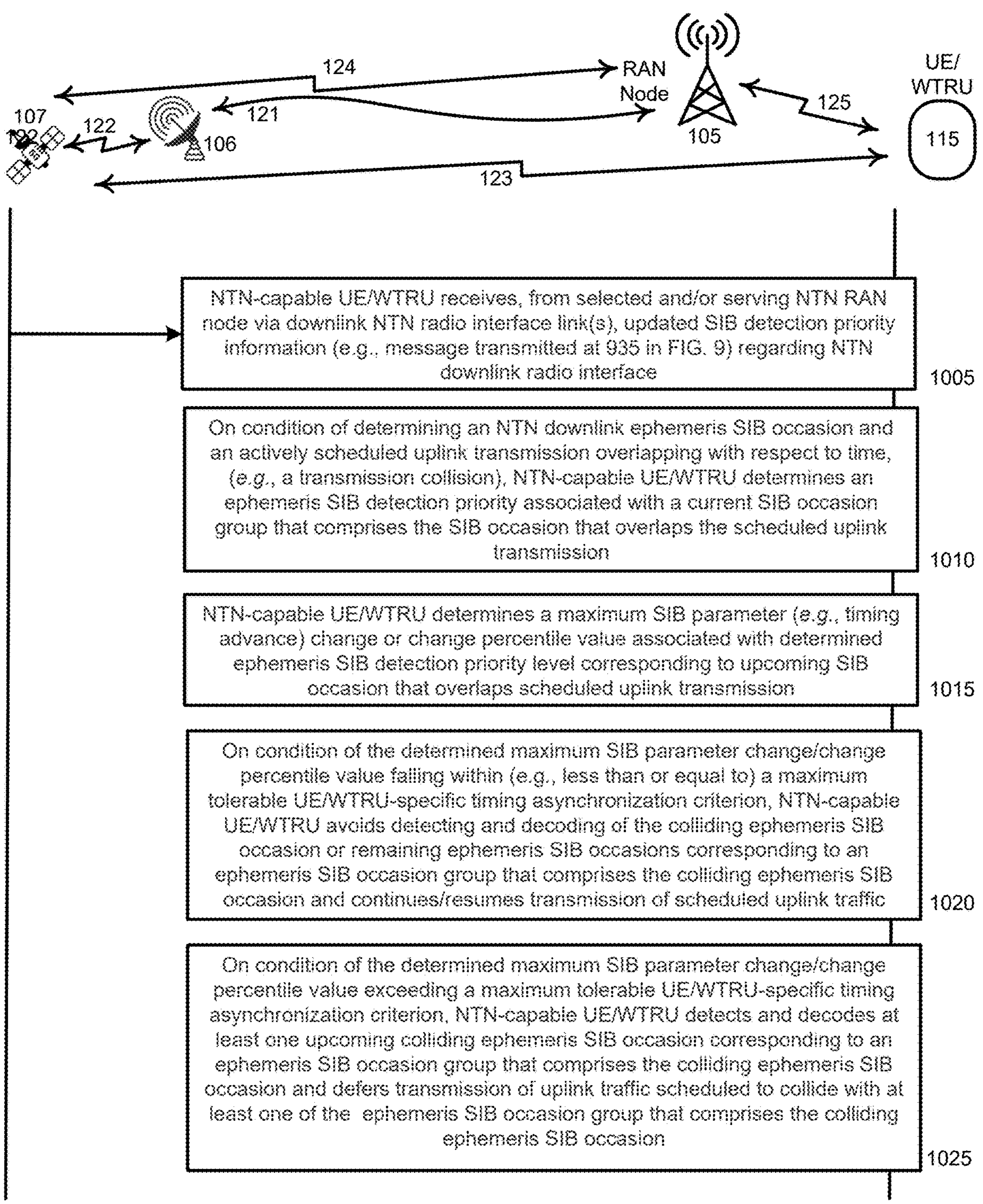
FIG. 10 illustrates an example timing diagram of a user equipment using ephemeris system information block group priority information to determine whether to receive ephemeris information.

Turning now to FIG. 10, the figure illustrates a timing diagram of an example method embodiment 1000. At act 1005, NTN-capable user equipment 115 may receive, via NTN downlink interface link(s) 123 from selected and/or serving NTN RAN node 107, updated SIB detection priority configuration information (e.g., via message 320 described in reference to FIG. 3) via downlink NTN radio interface link(s) 123. Information included in the information received at act 1005 may comprise similar information as NTN node 107 receives at act 905 as described in reference to FIG. 9. For example, information received at act 1005 may comprise ephemeris SIB priority levels and associated ranges of SIB parameter changes or change percentages shown in FIG. 6, and/or SIB occasion group indications and associated updated SIB group-specific priority levels shown in FIG. 7.

On condition of UE 115 determining a time-overlapping NTN downlink SIB occasion and an actively scheduled uplink traffic transmission, (e.g., a transmission collision if UE 115 is only operable as a half-duplex UE/WTRU), UE/WTRU 115 may, at act 1010 based on information received at act 1005 and an assigned SIB detection priority level associated with a SIB occasion group with respect to which the colliding/time-overlapping SIB occasion corresponds. UE 115 may determine the assigned SIB priority level based on a system information block priority indication message (e.g., message 330) that may be indicative of the assigned SIB priority corresponding to the overlapping SIB occasion. At act 1015, NTN-capable UE/WTRU 115 may determine a maximum possible SIB parameter value based on a parameter value change or change percentage (e.g., a change corresponding to a timing advance value) associated with the assigned SIB priority level determined at act 1010 to correspond to the upcoming, time-overlapping SIB occasion. On condition of the maximum possible SIB parameter value determined at act 1015 satisfying a maximum tolerable WTRU-specific timing asynchronization criterion (e.g., a configured UE-specific reception criterion, such as, for example, a maximum allowable timing advance), NTN-capable UE/WTRU 115 may skip detecting and decoding of the colliding/time-overlapping SIB occasion and/or remaining SIB occasions of the SIB occasion group that comprises the time-overlapping occasion, and may resume transmission of pending uplink traffic. On condition of the determined maximum possible SIB parameter determined at act 1015 failing to satisfy a maximum allowable UE/WTRU-specific timing asynchronization criterion, NTN-capable UE/WTRU 115 may halt uplink transmission and detect and decode one or more of upcoming colliding SIB occasions of the of the SIB occasion group that comprises the time-overlapping occasion and may defer transmission of the uplink traffic until after receiving ephemeris information, such as updated timing advance information, via an ephemeris SIB occasion of the ephemeris SIB occasion group that comprises the time-overlapping ephemeris SIB occasion. It will be appreciated that an asynchronization criterion specific to UE/WTRU 115 may be based on a quality of the UE/WTRU. For example, a UE/WTRU with higher quality electronic radio components or a more powerful processor may be configured with a higher allowable NTN timing advance mismatch than a UE/WTRU that has lower quality radio components or that has less processing capability.

Figure 11:
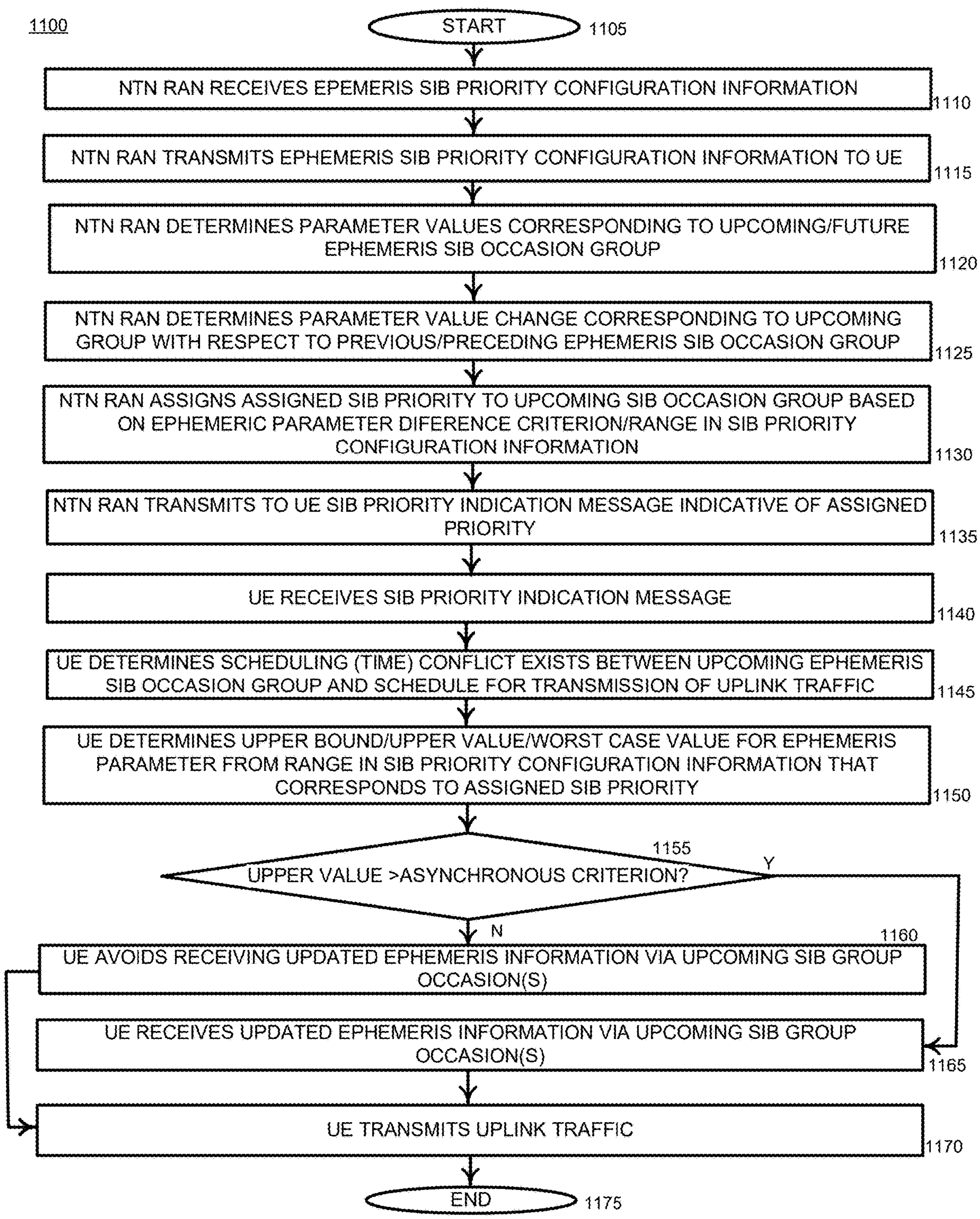
FIG. 11 illustrates a flow diagram of an example method to facilitate a user equipment using ephemeris system information block group priority information to determine whether to receive ephemeris information.

Turning now to FIG. 11, the figure illustrates a flow diagram of an example method 1100. Method 1100 begins at act 1105. At act 1110, a non-terrestrial network radio node 107 may receive an ephemeris system information block priority configuration information message 305, described in reference to FIG. 3, comprising information similar to information 410 shown in FIG. 6. At act 1115, the non-terrestrial radio network node may transmit ephemeris SIB priority configuration information (e.g., information 410) to a non-terrestrial-capable user equipment that may be only capable of half-duplex operation. At act 1120, the NTN node may determine ephemeris parameter values corresponding to the NTN node that are to be transmitted by the NTN node via at least one upcoming, or future, ephemeris SIB occasion. At act 1125, the NTN RAN node may determine at least one parameter value change corresponding to the at least one parameter value that may have been determined at act 1120 that is to be transmitted, or broadcast, via the at least one upcoming, or future, ephemeris SIB occasion. At act 1130, the NTN RAN node may assign an assigned SIB priority to an upcoming ephemeris SIB occasion group that comprises the at least one upcoming ephemeris SIB occasion. The assigning of the assigned SIB priority at act 1130 may be based on the at least one parameter value change determined at act 1125. At act 1135, the NTN RAN node may transmit to the user equipment a SIB priority indication message, for example message 330 described in reference to FIG. 3, indicative of the determined or assigned SIB priority assigned at act 1130.

At act 1140, the half-duplex non-terrestrial-network-capable user equipment may receive the SIB priority indication message transmitted by the NTN RAN node at act 1135. At act 1145, the user equipment may determine whether a scheduling conflict exists between an upcoming ephemeris SIB occasion group and scheduled time for transmission of traffic to the NTN RAN node by the user equipment in the uplink direction. At act 1150, the user equipment may determine an upper bound, a highest value, or a worst-case value of a parameter change range indicated in the priority configuration information, transmitted/broadcast by the NTN RAN node at act 1115, that corresponds to the assigned SIB priority assigned by the NTN RAN node at act 1130 and transmitted to the user equipment at act 1135.

At act 1155, the user equipment may analyze the upper bound, or highest value, determined at act 1150 with respect to an asynchronization criterion. For example, the user equipment may determine whether a maximum timing advance value of a range that corresponds to the priority indication transmitted by the NTN RAN node at act 1135 and that corresponds to an upcoming ephemeris SIB occasion exceeds a configured maximum allowable timing advance criterion wherein exceeding of the maximum allowable timing advance criterion would likely result in failure of a non-terrestrial radio link between the user equipment and the NTN RAN node. If the user equipment determines at act 1155 that the maximum timing advance value of the range that corresponds to the priority indication transmitted at act 1135 would exceed the configured maximum allowable timing advance criterion, method 1100 may advance to act 1165. At act 1165, the user equipment may suspend transmitting of the scheduled uplink traffic to the NTN RAN node, may switch from operating according to an uplink transmission mode to operating according to a downlink traffic reception mode, and may receive ephemeris information, for example information 340 shown in FIG. 3, via an ephemeris SIB occasion that temporally conflicts with the scheduling of transmission of the scheduled uplink traffic. After receiving the ephemeris information at act 1165, the user equipment may switch back to a transmission mode of operation and continue, or resume, transmission of the scheduled uplink traffic that the user equipment interrupted to facilitate receiving the updated ephemeris information via the ephemeris SIB occasion that temporally conflicted with the scheduling of transmission of the uplink traffic. Method 1100 advances from act 1170 to act 1175 and ends.

Returning to description of act 1155, if the user equipment determines that an upper value of a range associated with the assigned SIB priority that corresponds to an upcoming ephemeris SIB occasion that temporally conflicts with the scheduling of transmission of uplink traffic does not exceed and asynchronization criterion, for example a timing advance criterion, at act 1160 the user may avoid receiving updated ephemeris information via an upcoming ephemeris SIB occasion that conflicts with transmission of scheduled uplink traffic. At act 1170, and the user equipment may continue to transmit uplink traffic according to scheduling thereof, even during a period corresponding to the temporally conflicting/overlapping ephemeris SIB occasion. Method 1100 ends at act 1175.

Turning now to FIG. 12, the figure illustrates an example embodiment method 1200 comprising at block 1205 facilitating, by a non-terrestrial radio network node comprising at least one processor, receiving, from a core network element, at least one ephemeris system information block priority configuration information message comprising ephemeris system information block information; at block 1210 assigning, by the non-terrestrial radio network node, at least one system information block priority to at least one ephemeris system information block group indicated by the ephemeris system information block information to result in at least one assigned system information block priority corresponding to the at least one ephemeris system information block group, wherein the at least one ephemeris system information block group comprises at least one ephemeris system information block; at block 1215 facilitating, by the non-terrestrial radio network node, transmitting, to at least one user equipment, a system information block priority indication message indicative of the at least one assigned system information block priority corresponding to the at least one ephemeris system information block group; and at block 1220 wherein the at least one assigned system information block priority is to be usable by the at least one user equipment to receive, according to the at least one assigned system information block priority, ephemeris information, corresponding to the non-terrestrial radio network node, via the at least one ephemeris system information block.

Turning now to FIG. 13, the figure illustrates a non-terrestrial radio network node 1300, comprising at block 1305 at least one processor configured to process executable instructions that, when executed by the at least one processor, facilitate performance of operations, comprising determining at least one system information block priority corresponding to at least one ephemeris system information block group to result in at least one determined system information block priority corresponding to the at least one ephemeris system information block group, wherein the at least one ephemeris system information block group comprises at least one ephemeris system information block; and at block 1310 transmitting, to at least one user equipment, a system information block priority indication message indicative of the at least one determined system information block priority, wherein the at least one determined system information block priority is to be usable by the at least one user equipment to determine to avoid receiving ephemeris information, corresponding to the non-terrestrial radio network node, via the at least one ephemeris system information block.

Turning now to FIG. 14 the figure illustrates a non-transitory machine-readable medium 1400 comprising at block 1405 executable instructions that, when executed by at least one processor of a non-terrestrial radio network node, facilitate performance of operations, comprising receiving, via at least one backhaul interface link, at least one ephemeris system information block priority configuration information message comprising ephemeris system information block information; at block 1410 transmitting, to at least one user equipment, a system information block priority indication message indicative of a system information block first priority, wherein the ephemeris system information block information comprises the system information block first priority; at block 1415 responsive to an occurrence of a system information block priority indication message transmission triggering event, transmitting, to the at least one user equipment, a system information block updated priority indication message indicative of a system information block second priority; and at block 1420 wherein the system information block first priority or the system information block second priority is to be usable by the at least one user equipment to determine to receive ephemeris information corresponding to the non-terrestrial radio network node.

Turning now to FIG. 15, the figure illustrates an example embodiment method 1500 comprising, at block 1505, receiving, by a user equipment comprising at least one processor from a non-terrestrial radio network node, a system information block priority indication message indicative of at least one assigned system information block priority corresponding to at least one ephemeris system information block group; and at block 1510 based on the at least one assigned system information block priority, performing, by the user equipment, an ephemeris system information block receiving operation.

Turning now to FIG. 16, the figure illustrates an example user equipment 1600, comprising at block 1605 at least one processor configured to process executable instructions that, when executed by the at least one processor, facilitate performance of operations comprising receiving, from a non-terrestrial radio network node, a system information block priority indication message indicative of at least one assigned system information block priority corresponding to an upcoming ephemeris system information block group that comprises at least one upcoming ephemeris system information block group occasion; at block 1610 determining that at least one of the at least one upcoming ephemeris system information block group occasion overlaps, with respect to time during an overlap period, a scheduled uplink traffic period during which uplink traffic is scheduled to be transmitted by the user equipment to the non-terrestrial radio network node; at block 1615 based on the at least one assigned system information block priority, determining an ephemeris system information block receiving operation to result in a determined ephemeris system information block receiving operation; and at block 1620 performing the determined ephemeris system information block receiving operation.

Turning now to FIG. 17, the figure illustrates a non-transitory machine-readable medium 1700 comprising at block 1705 executable instructions that, when executed by at least one processor of a user equipment, facilitate performance of operations, comprising receiving, from a non-terrestrial radio network node, a system information block priority configuration information message comprising at least one system information block criterion associated with at least one system information block priority; at block 1710 receiving, from the non-terrestrial radio network node, a system information block priority indication message indicative of at least one assigned system information block priority corresponding to an upcoming ephemeris system information block group comprising at least one upcoming ephemeris system information block group occasion; at block 1715 determining that at least one of the at least one upcoming ephemeris system information block group occasion overlaps, with respect to time during an overlap period, a scheduled uplink traffic period during which uplink traffic is scheduled to be transmitted by the user equipment to the non-terrestrial radio network node; at block 1720 based on the at least one assigned system information block priority, determining at least one assigned system information block priority criterion, associated with the at least one system information block priority in the system information block priority configuration information message, to result in at least one determined assigned system information block criterion; at block 1725 analyzing the at least one determined assigned system information block criterion with respect to at least one timing asynchronization criterion to result in at least one analyzed determined assigned system information block criterion; at block 1730 based on the at least one analyzed determined assigned system information block criterion being determined to satisfy the at least one timing asynchronization criterion, avoiding receiving ephemeris information via the at least one upcoming ephemeris system information block group occasion; and at block 1735 transmitting, during the at least one upcoming ephemeris system information block group occasion that overlaps the scheduled uplink traffic period, the uplink traffic.

Figure 18:
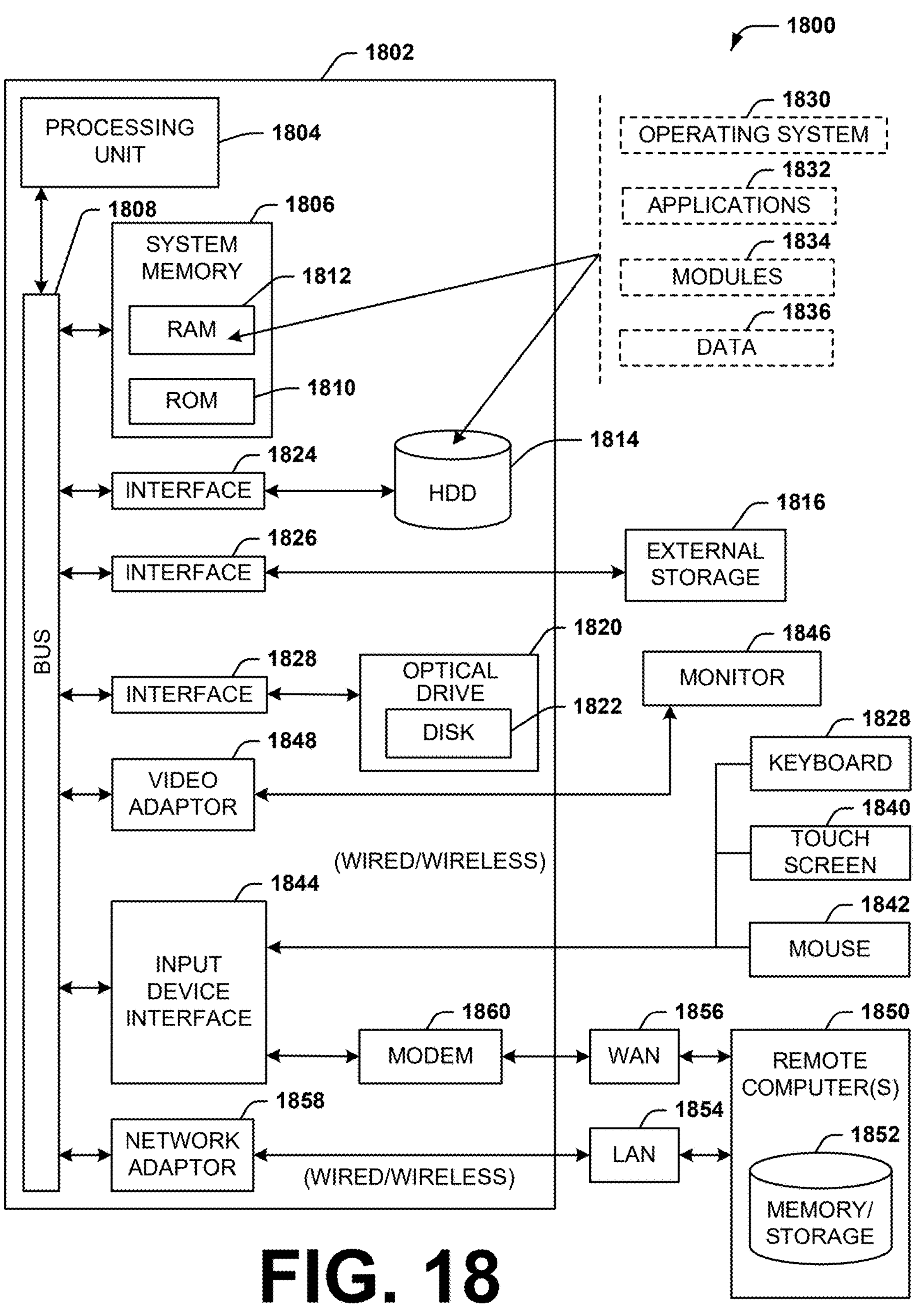
FIG. 18 illustrates an example computer environment in accordance with an embodiment of the subject application.

In order to provide additional context for various embodiments described herein, FIG. 18 and the following discussion are intended to provide a brief, general description of a suitable computing environment 1800 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors and may include a cache memory. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

Computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and an optical disk drive 1820 (e.g., which can read or write from a CD-ROM disc, a DVD, a BD, etc.). While the internal HDD 1814 is illustrated as located within the computer 1802, the internal HDD 1814 can also be configured for external use in a suitable chassis (not shown). Additionally, while not shown in environment 1800, a solid-state drive (SSD) could be used in addition to, or in place of, an HDD 1814. The HDD 1814, external storage device(s) 1816 and optical disk drive 1820 can be connected to the system bus 1808 by an HDD interface 1824, an external storage interface 1826 and an optical drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for applications 1832. Runtime environments are consistent execution environments that allow applications 1832 to run on any operating system that includes the runtime environment. Similarly, operating system 1830 can support containers, and applications 1832 can be in the form of containers, which are lightweight, standalone, executable packages of software that include, e.g., code, runtime, system tools, system libraries and settings for an application.

Further, computer 1802 can comprise a security module, such as a trusted processing module (TPM). For instance, with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1846 or other type of display device can be also connected to the system bus 1808 via an interface, such as a video adapter 1848. In addition to the monitor 1846, a computer typically includes other peripheral output devices (not shown), such as speakers, printers, etc.

The computer 1802 can operate in a networked environment using logical connections via wired and/or wireless communications to one or more remote computers, such as a remote computer(s) 1850. The remote computer(s) 1850 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1852 is illustrated. The logical connections depicted include wired/wireless connectivity to a local area network (LAN) 1854 and/or larger networks, e.g., a wide area network (WAN) 1856. Such LAN and WAN networking environments are commonplace in offices and companies, and facilitate enterprise-wide computer networks, such as intranets, all of which can connect to a global communications network, e.g., the internet.

When used in a LAN networking environment, the computer 1802 can be connected to the local network 1854 through a wired and/or wireless communication network interface or adapter 1858. The adapter 1858 can facilitate wired or wireless communication to the LAN 1854, which can also include a wireless access point (AP) disposed thereon for communicating with the adapter 1858 in a wireless mode.

When used in a WAN networking environment, the computer 1802 can include a modem 1860 or can be connected to a communications server on the WAN 1856 via other means for establishing communications over the WAN 1856, such as by way of the internet. The modem 1860, which can be internal or external and a wired or wireless device, can be connected to the system bus 1808 via the input device interface 1844. In a networked environment, program modules depicted relative to the computer 1802 or portions thereof, can be stored in the remote memory/storage device 1852. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above. Generally, a connection between the computer 1802 and a cloud storage system can be established over a LAN 1854 or WAN 1856 e.g., by the adapter 1858 or modem 1860, respectively. Upon connecting the computer 1802 to an associated cloud storage system, the external storage interface 1826 can, with the aid of the adapter 1858 and/or modem 1860, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 19:
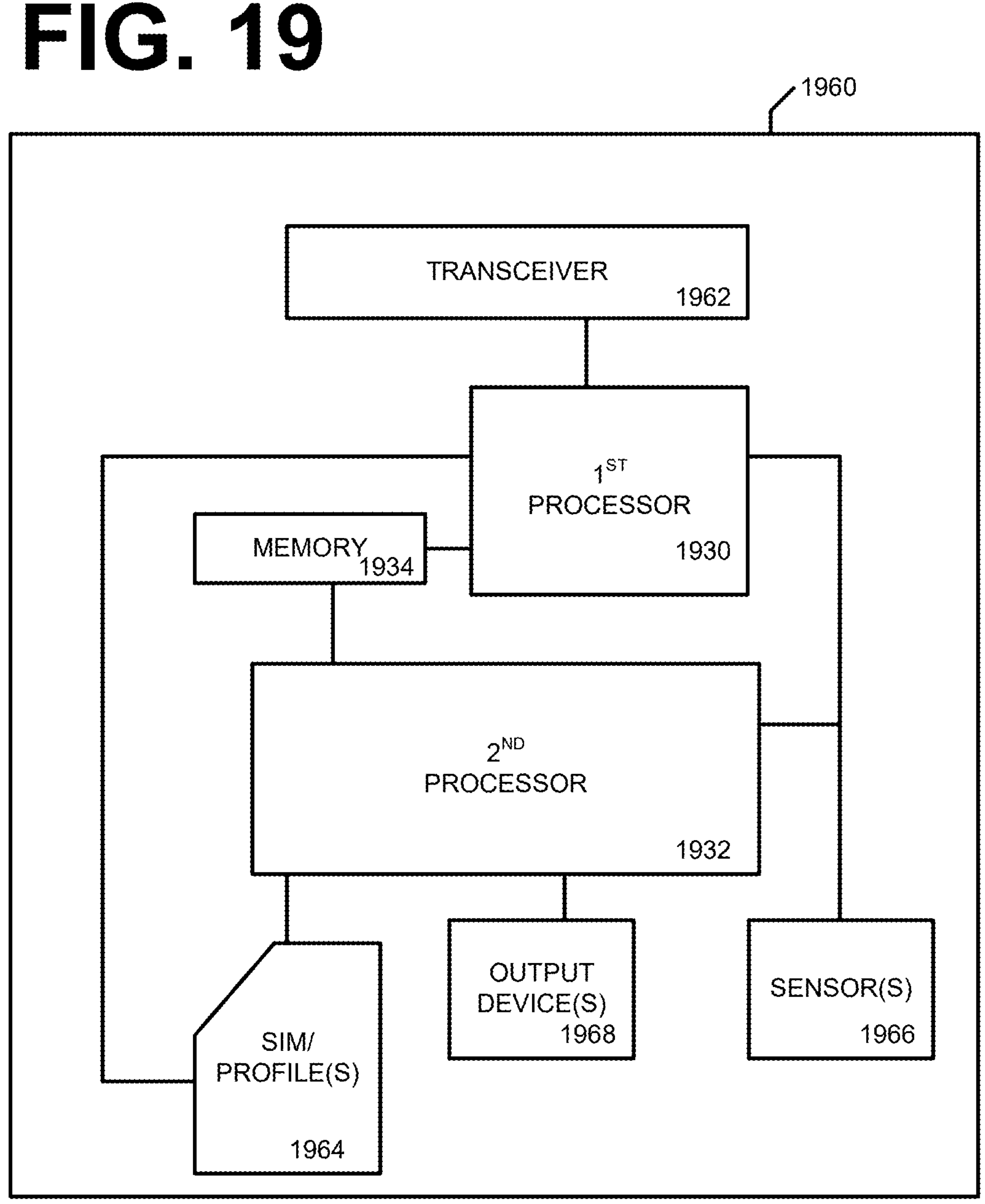
FIG. 19 illustrates a block diagram of an example wireless user equipment in accordance with an embodiment of the subject application.

Turning to FIG. 19, the figure illustrates a block diagram of an example UE 1960. UE 1960 may comprise a smart phone, a wireless tablet, a laptop computer with wireless capability, a wearable device, a machine device that may facilitate vehicle telematics, a tracking device, remote sensing devices, and the like. UE 1960 comprises a first processor 1930, a second processor 1932, and a shared memory 1934. UE 1960 includes radio front end circuitry 1962, which may be referred to herein as a transceiver, but is understood to typically include transceiver circuitry, separate filters, and separate antennas for facilitating transmission and receiving of signals over a wireless link, such as one or more wireless links 123, 125, 135, or 137 shown in FIG. 1. Furthermore, transceiver 1962 may comprise multiple sets of circuitry or may be tunable to accommodate different frequency ranges, different modulations schemes, or different communication protocols, to facilitate long-range wireless links such as links 123 or 125, device-to-device links, such as links 135, and short-range wireless links, such as links 137.

Continuing with description of FIG. 19, UE 1960 may also include a SIM 1964, or a SIM profile, which may comprise information stored in a memory (memory 1934 or a separate memory portion), for facilitating wireless communication with RAN 105 or core network 130 shown in FIG. 1. FIG. 19 shows SIM 1964 as a single component in the shape of a conventional SIM card, but it will be appreciated that SIM 1964 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1964 and another device, which may be a component of RAN 105 or core network 130 shown in FIG. 1). A SIM profile 1964 may also comprise identifying information that is unique to the SIM, or SIM profile, such as, for example, an International Mobile Subscriber Identity ("IMSI") or information that may make up an IMSI.

SIM 1964 is shown coupled to both the first processor portion 1930 and the second processor portion 1932. Such an implementation may provide an advantage that first processor portion 1930 may not need to request or receive information or data from SIM 1964 that second processor 1932 may request, thus eliminating the use of the first processor acting as a 'go-between' when the second processor uses information from the SIM in performing its functions and in executing applications. First processor 1930, which may be a modem processor or a baseband processor, is shown smaller than processor 1932, which may be a more sophisticated application processor, to visually indicate the relative levels of sophistication (i.e., processing capability and performance) and corresponding relative levels of operating power consumption levels between the two processor portions. Keeping the second processor portion 1932 asleep/inactive/in a low power state when UE 1960 does not need it for executing applications and processing data related to an application provides an advantage of reducing power consumption when the UE only needs to use the first processor portion 1930 while in listening mode for monitoring routine configured bearer management and mobility management/maintenance procedures, or for monitoring search spaces that the UE has been configured to monitor while the second processor portion remains inactive/asleep.

UE 1960 may also include sensors 1966, such as, for example, temperature sensors, accelerometers, gyroscopes, barometers, moisture sensors, and the like that may provide signals to the first processor 1930 or second processor 1932. Output devices 1968 may comprise, for example, one or more visual displays (e.g., computer monitors, VR appliances, and the like), acoustic transducers, such as speakers or microphones, vibration components, and the like. Output devices 1968 may comprise software that interfaces with output devices, for example, visual displays, speakers, microphones, touch sensation devices, smell or taste devices, and the like, that are external to UE 1960.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |
| UE | User equipment |
| WTRU | Wireless transmit receive unit |
| CBR | Channel busy ratio |
| SCI | Sidelink control information |
| QoS | Quality of service |
| PER | Packet error rate |
| PDB | Packet delay budget |
| E2E | End to end |
| NES | Network energy saving |
| QCI | Quality class indication |
| RSRP | Reference signal received power |
| PCI | Primary cell ID |
| CSI-RS | Channel state information reference signals |
| PTRS | Phase tracking reference signals |
| DTX | Discontinuous transmission or discontinuous transmit |
| DRX | Discontinuous reception or discontinuous receive |
| CG | Configured grant |
| ULP | Uplink power |
| FBS | Fake base station |
| NTN | Non-terrestrial network |
| gRAN | Ground radio access network |
| RAN | Radio access network |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a non-terrestrial radio network node comprising at least one processor, receiving, from a core network element, at least one ephemeris system information block priority configuration information message comprising ephemeris system information block information;

assigning, by the non-terrestrial radio network node, at least one system information block priority to at least one ephemeris system information block group indicated by the ephemeris system information block information to result in at least one assigned system information block priority corresponding to the at least one ephemeris system information block group, wherein the at least one ephemeris system information block group comprises at least one ephemeris system information block; and facilitating, by the non-terrestrial radio network node, transmitting, to at least one user equipment, a system information block priority indication message indicative of the at least one assigned system information block priority corresponding to the at least one ephemeris system information block group, wherein the at least one assigned system information block priority is to be usable by the at least one user equipment to receive, according to the at least one assigned system information block priority, ephemeris information, corresponding to the non-terrestrial radio network node, via the at least one ephemeris system information block.

2. The method of claim 1, wherein the ephemeris system information block information comprises at least one of: an ephemeris system information block group information indication indicative ephemeris system information block group information corresponding to at least one ephemeris system information block group, or at least one ephemeris system information block group priority indication indicative of at least one ephemeris system information block group priority.

3. The method of claim 1, wherein the assigning of the at least one system information block priority to the at least one ephemeris system information block group is based on determining, by the non-terrestrial radio network node, at least one system information block parameter change value, associated with at least one system information block parameter, corresponding to the at least one ephemeris system information block group.

4. The method of claim 1, wherein the facilitating of the transmitting of the system information block priority indication message is responsive to receiving, by the non-terrestrial radio network node from the at least one user equipment, a system information block priority indication request.

5. The method of claim 1, wherein the facilitating of the transmitting of the system information block priority indication message is responsive to expiration of a configured system information block priority broadcast periodicity.

6. The method of claim 5, wherein the ephemeris system information block information comprises a system information block priority broadcast periodicity indication indicative of the configured system information block priority broadcast periodicity.

7. The method of claim 1, wherein the at least one ephemeris system information block is a system information block 19 ("SIB19") message.

8. The method of claim 1, wherein the at least one ephemeris system information block group is a first ephemeris system information block group, wherein the ephemeris information comprises at least one first ephemeris parameter value corresponding to at least one ephemeris parameter and associated with the first ephemeris system information block group, wherein at least one first ephemeris system information block group occasion corresponds to transmitting, by the non-terrestrial radio network node, first system information block information associated with the at least one ephemeris parameter, wherein a second ephemeris system information block group comprises at least one second ephemeris system information block group occasion corresponding to transmitting, by the non-terrestrial radio network node, second system information block information associated with the at least one ephemeris parameter, wherein the at least one assigned system information block priority is assigned to the first ephemeris system information block group, wherein the at least one second ephemeris system information block group occasion occurs before the at least one first ephemeris system information block group occasion, and wherein the method further comprises:

determining, by the non-terrestrial radio network node, the at least one assigned system information block priority based on at least one ephemeris parameter difference between the at least one first ephemeris parameter value and at least one second ephemeris parameter value that corresponds to the at least one ephemeris parameter and that is associated with the second ephemeris system information block group.

9. The method of claim 8, wherein the ephemeris system information block information comprises the at least one assigned system information block priority, wherein the ephemeris system information block information comprises at least one ephemeris parameter difference criterion associated with the at least one assigned system information block priority, and wherein the determining the at least one assigned system information block priority further comprises:

analyzing the at least one ephemeris parameter difference with respect to the at least one ephemeris parameter difference criterion to result in an analyzed at least one ephemeris parameter difference, wherein the assigning the at least one assigned system information block priority is assigned based on the at least one ephemeris parameter difference being determined to satisfy the at least one ephemeris parameter difference criterion.

10. The method of claim 8, wherein the at least one ephemeris parameter comprises at least one of: a timing advance associated with the non-terrestrial radio network node, a frequency shift associated with the non-terrestrial radio network node, a doppler shift associated with the non-terrestrial radio network node, or a location associated with the non-terrestrial radio network node.

11. The method of claim 8, wherein the determining of the at least one assigned system information block priority comprises applying at least one function to the at least one first ephemeris system information block group occasion, wherein the applying of the at least one function comprises determining an average of at least one first ephemeris system information block group occasion parameter value to result in the at least one first ephemeris parameter value or filtering the at least one first ephemeris system information block group occasion parameter value to result in the at least one first ephemeris parameter value.

12. A non-terrestrial radio network node, comprising at least one processor configured to process executable instructions that, when executed by the at least one processor, facilitate performance of operations, comprising:

determining at least one system information block priority corresponding to at least one ephemeris system information block group to result in at least one determined system information block priority corresponding to the at least one ephemeris system information block group, wherein the at least one ephemeris system information block group comprises at least one ephemeris system information block; and transmitting, to at least one user equipment, a system information block priority indication message indicative of the at least one determined system information block priority, wherein the at least one determined system information block priority is to be usable by the at least one user equipment to determine to avoid receiving ephemeris information, corresponding to the non-terrestrial radio network node, via the at least one ephemeris system information block.

13. The non-terrestrial radio network node of claim 12, wherein the determining of the at least one system information block priority is based on at least one ephemeris parameter difference between at least one first ephemeris parameter value that corresponds to a first ephemeris system information block group and at least one second ephemeris parameter value that corresponds to a second ephemeris system information block group.

14. The non-terrestrial radio network node of claim 13, wherein the at least one first ephemeris parameter value and the at least one second ephemeris parameter value correspond to at least one of: a timing advance parameter associated with the non-terrestrial radio network node, a frequency shift parameter associated with the non-terrestrial radio network node, a doppler shift parameter associated with the non-terrestrial radio network node, or a location parameter associated with the non-terrestrial radio network node.

15. The non-terrestrial radio network node of claim 12, wherein the operations further comprise:

determining a system information block updated priority corresponding to the at least one ephemeris system information block group to result in at least one determined system information block updated priority corresponding to the at least one ephemeris system information block group; and transmitting, to the at least one user equipment, a system information block updated priority indication message indicative of the at least one determined system information block updated priority, wherein the at least one determined system information block updated priority is to be usable by the at least one user equipment to determine to avoid receiving ephemeris information, corresponding to the non-terrestrial radio network node, via the at least one ephemeris system information block.

16. The non-terrestrial radio network node of claim 15, wherein the determining of the at least one system information block updated priority comprises:

analyzing at least one ephemeris parameter difference with respect to at least one ephemeris parameter difference criterion to result in at least one analyzed ephemeris parameter difference; and determining that the at least one analyzed ephemeris parameter difference satisfies at least one of the at least one ephemeris parameter difference criterion corresponding to the at least one determined system information block updated priority.

17. A non-transitory machine-readable medium, comprising executable instructions that, when executed by at least one processor of a non-terrestrial radio network node, facilitate performance of operations, comprising:

receiving, via at least one backhaul interface link, at least one ephemeris system information block priority configuration information message comprising ephemeris system information block information;

transmitting, to at least one user equipment, a system information block priority indication message indicative of a system information block first priority, wherein the ephemeris system information block information comprises the system information block first priority; and responsive to an occurrence of a system information block priority indication message transmission triggering event, transmitting, to the at least one user equipment, a system information block updated priority indication message indicative of a system information block second priority, wherein the system information block first priority or the system information block second priority is to be usable by the at least one user equipment to determine to receive ephemeris information corresponding to the non-terrestrial radio network node.

18. The non-transitory machine-readable medium of claim 17, wherein the system information block first priority corresponds to a first ephemeris system information block group, wherein the system information block second priority corresponds to a second ephemeris system information block group, and wherein the operations further comprise:

determining a first parameter value corresponding to the first ephemeris system information block group;

determining a second parameter value corresponding to the second ephemeris system information block group;

determining an ephemeris parameter difference based on the first parameter value and the second parameter value; and analyzing the ephemeris parameter difference with respect to at least one ephemeris parameter difference criterion to result in at least one analyzed ephemeris parameter difference, wherein the system information block second priority is determined based on the at least one analyzed ephemeris parameter difference being determined to satisfy at least one of the at least one ephemeris parameter difference criterion corresponding to the system information block second priority.

19. The non-transitory machine-readable medium of claim 17, wherein the system information block priority indication message transmission triggering event is one of: reception, from the at least one user equipment, of a system information block priority indication request;

or expiration of a configured system information block priority broadcast periodicity.

20. The non-transitory machine-readable medium of claim 17, wherein the system information block priority indication message is further indicative of a first ephemeris parameter difference criterion associated with the system information block first priority or a second ephemeris parameter difference criterion associated with the system information block second priority, and wherein the first ephemeris parameter difference criterion or the second ephemeris parameter difference criterion is to be usable by the at least one user equipment to determine to receive the ephemeris information corresponding to the non-terrestrial radio network node.

* * * * *